(12) United States Patent
Lee

(10) Patent No.: US 12,038,316 B2
(45) Date of Patent: Jul. 16, 2024

(54) FLUID STORAGE SYSTEMS AND MONITORING

(71) Applicant: Darling Ingredients Inc., Irving, TX (US)

(72) Inventor: Craig Allen Lee, Frisco, TX (US)

(73) Assignee: Darling Ingredients Inc., Irving, TX (US)

( * ) Notice: Subject to any disclaimer, the term of this patent is extended or adjusted under 35 U.S.C. 154(b) by 0 days.

(21) Appl. No.: 17/661,392

(22) Filed: Apr. 29, 2022

(65) Prior Publication Data

US 2022/0349741 A1 Nov. 3, 2022

Related U.S. Application Data

(60) Provisional application No. 63/182,595, filed on Apr. 30, 2021.

(51) Int. Cl.
*G01F 23/296* (2022.01)
*F16K 5/06* (2006.01)
*F16K 31/42* (2006.01)

(52) U.S. Cl.
CPC .......... *G01F 23/296* (2013.01); *F16K 5/0652* (2013.01); *F16K 31/42* (2013.01)

(58) Field of Classification Search
CPC .... G01F 23/296; G01F 23/2962; G01F 23/28; F16K 5/0652; F16K 31/42
See application file for complete search history.

(56) References Cited

U.S. PATENT DOCUMENTS

| | | | |
|---|---|---|---|
| 4,487,065 A * | 12/1984 | Carlin | G01F 23/296 367/908 |
| 5,812,060 A | 9/1998 | DeSpain et al. | |
| 5,964,258 A | 10/1999 | Schoenbauer | |
| 7,253,725 B2 * | 8/2007 | Breed | G06K 7/10178 340/447 |
| 7,610,805 B2 | 11/2009 | Crider | |
| 8,271,192 B2 * | 9/2012 | Jung | G01C 21/3641 701/538 |
| 8,831,413 B2 | 9/2014 | Arnold et al. | |

(Continued)

FOREIGN PATENT DOCUMENTS

| CN | 111052758 | 4/2020 |
|---|---|---|
| DE | 4231235 | 3/1994 |

(Continued)

OTHER PUBLICATIONS

[No. Author], "Embrace the proven, welcome the new," Siemens, 2020, 32 pages.

(Continued)

*Primary Examiner* — Tarun Sinha
(74) *Attorney, Agent, or Firm* — Fish & Richardson P.C.

(57) ABSTRACT

A monitoring unit for a fluid storage receptacle includes a sensor to attach to the fluid storage receptacle and detect an amount of empty space between fluid contents of the fluid storage receptacle and the sensor, and a transmitter to receive and transmit data from the sensor. The monitoring unit also includes a proximity sensor to detect a presence of a beacon within a proximity range of the proximity sensor, a controller to selectively open a fluid control valve of the waste oil receptacle, or both the proximity sensor and the controller.

25 Claims, 15 Drawing Sheets

(56) References Cited

U.S. PATENT DOCUMENTS

| | | |
|---|---|---|
| 9,462,913 B1 | 10/2016 | Griffin et al. |
| 9,820,613 B2 | 11/2017 | Palazzo et al. |
| 10,685,103 B2 | 6/2020 | Grammer et al. |
| 2005/0133192 A1 | 6/2005 | Meszaros et al. |
| 2007/0084283 A1 | 4/2007 | Carlson et al. |
| 2007/0255458 A1 | 11/2007 | Haslem |
| 2016/0011036 A1 | 1/2016 | Wiersma et al. |
| 2016/0146659 A1* | 5/2016 | Saltzgiver ............ B65D 51/245 73/304 C |
| 2016/0273953 A1 | 9/2016 | Schlensker |
| 2020/0180937 A1 | 6/2020 | Frith et al. |
| 2021/0009402 A1 | 1/2021 | Moskowitz |
| 2021/0026040 A1 | 1/2021 | Aughton et al. |

FOREIGN PATENT DOCUMENTS

| | | |
|---|---|---|
| DE | 60101070 | 7/2004 |
| DE | 102018129582 | 5/2020 |
| FR | 2890440 | 3/2007 |
| KR | 101082241 | 11/2011 |
| WO | WO 2003077721 | 9/2003 |
| WO | WO 2018220571 | 12/2018 |

OTHER PUBLICATIONS

ABB.com [online], "A dozen ways to measure fluid level," Sep. 2015, retrieved on Sep. 26, 2022, retrieved from URL <https://new.abb.com/products/measurement-products/level/a-dozen-ways-to-measure-fluid-level#:~:text=A%20dozen%20ways%20to%20measure%20fluid%20level%20Established,Transmitters%20are%20all%20hydrostatic%20measurement...%20Modern%20technologies.%20>, 14 pages.

International Search Report and Written Opinion in International Application No. PCT/US2022/027023, mailed on Aug. 12, 2022, 16 pages.

International Search Report and Written Opinion in International Application No. PCT/US2022/027038, mailed on Sep. 13, 2022, 17 pages.

International Preliminary Report on Patentability in International Application No. PCT/US2022/027023, mailed on Nov. 9, 2023, 10 pages.

International Preliminary Report on Patentability in International Application No. PCT/US2022/027038, mailed on Nov. 9, 2023, 11 pages.

* cited by examiner

FLUID STORAGE SYSTEMS AND MONITORING

CROSS-REFERENCE TO RELATED PATENT APPLICATIONS

This application claims the benefit of priority to U.S. Patent Application No. 63/182,595, filed Apr. 30, 2021, the contents of which are incorporated by reference herein.

TECHNICAL FIELD

This disclosure relates to fluid storage systems and monitoring, such as used cooking oil storage.

BACKGROUND

At some restaurants, used cooking oil is stored in used cooking oil tanks and other types of containers. Vehicles (e.g., service trucks) equipped with vacuum or siphoning equipment are used to remove the used cooking oil from these tanks, usually by request of the restaurant or at scheduled time intervals. The vacuum equipment is connected to a plumbed collection point at an exterior wall of a restaurant in instances when the tank is stored inside the restaurant, and placed inside the tank itself or connected to a valved nozzle in instances when the tank is an exterior storage tank. Used cooking oil can be valuable so the used cooking oil tanks are targets for thieves attempting to steal the used cooking oil.

SUMMARY

This disclosure describes fluid content level detection in fluid receptacles, such as used cooking oil tanks, and anti-theft monitoring and control of the fluid receptacles.

In some aspects, a fluid storage system includes a fluid storage receptacle defining an interior volume and configured to hold fluid contents, and a monitoring unit coupled to the fluid storage receptacle proximate a top of the fluid storage receptacle. The fluid storage receptacle can include a drainage fluid line or a direct access point to the fluid. The monitoring unit includes a fluid level sensor directed vertically downward into the interior volume of the fluid storage receptacle, the fluid level sensor to detect an amount of space between the fluid contents and the fluid level sensor, a transmitter to receive and transmit data from the fluid level sensor, and a proximity sensor to detect the presence of a beacon within a proximity range of the monitoring unit.

This, and other aspects, can include one or more of the following features. The fluid storage system can include a ventilation cap at a top of the fluid storage receptacle, the ventilation cap to control ventilation of the interior volume of the fluid storage receptacle, and the monitoring unit being coupled to the ventilation cap. The fluid level sensor can be an ultrasonic sensor. The ultrasonic sensor can include a horn to channel ultrasonic waves from the ultrasonic sensor toward fluid contents in the interior volume of the fluid storage receptacle. The horn can be a conical horn. The monitoring unit can include at least one magnet, and the fluid storage receptacle can include an interior metallic surface, the monitoring unit to magnetically attach to the interior metallic surface of the fluid storage receptacle. The fluid storage receptacle can include a drainage fluid line, and the fluid storage system can further include a fluid control valve in the drainage fluid line, the fluid control valve to control a fluid flow along the drainage fluid line, the fluid control valve being communicably coupled to the monitoring unit. The fluid control valve can include a motorized ball valve to selectively open in response to the proximity sensor detecting the presence of the beacon. The fluid storage system can further include a vacuum switch in the drainage fluid line downstream of the fluid control valve, the vacuum switch being communicably coupled to the monitoring unit, the vacuum switch to detect a pressure change in the drainage fluid line downstream of the fluid control valve.

Certain aspects encompass a method for controlling a fluid storage system. The method includes attaching a monitoring unit to a fluid storage receptacle proximate a top of the fluid storage receptacle, the fluid storage receptacle configured to hold fluid contents, detecting, with a fluid level sensor of the monitoring unit, an amount of space between the fluid contents and the fluid level sensor, transmitting, with a transmitter of the monitoring unit, data from the fluid level sensor to a server, the data being representative of the amount of space between the fluid contents and the fluid level sensor, and detecting, with a proximity sensor of the monitoring unit, a presence of a beacon within a proximity range of the monitoring unit.

This, and other aspects, can include one or more of the following features. The method can further include, in response to detecting the presence of the beacon, opening a fluid control valve in a drainage fluid line of the fluid storage receptacle. The method can further include detecting that the beacon is no longer present within the proximity range, and closing the fluid control valve in response to detecting that the beacon is no longer present within the proximity range. The fluid control valve can include a motorized ball valve, and opening the fluid control valve can include opening the motorized ball valve. Opening the motorized ball valve can include providing power to the motorized ball valve. The proximity range can be about 30 feet, and detecting the presence of the beacon within the proximity range of the monitoring unit can include detecting that a truck comprising the beacon is within about 30 feet or less of the monitoring unit. The proximity sensor can be a Bluetooth sensor. The Bluetooth sensor can be a Bluetooth Low Energy sensor. Attaching the monitoring unit to the fluid storage receptacle can include attaching the monitoring unit to a ventilation cap at a top of the fluid storage receptacle, the ventilation cap to control ventilation of an interior volume of the fluid storage receptacle. Attaching the monitoring unit to the fluid storage receptacle can include magnetically attaching, with at least one magnet of the monitoring unit, the monitoring unit to a metallic interior surface of the fluid storage receptacle. The fluid level sensor can be an ultrasonic sensor. Transmitting data from the monitoring unit to a server can include wirelessly transmitting data over a network to a remote server in a location remote from the monitoring unit.

In some aspects, a monitoring unit for a waste oil (e.g., used cooking oil) receptacle includes an ultrasonic sensor to attach to a waste oil receptacle and detect an amount of empty space between fluid contents of the waste oil receptacle and the ultrasonic sensor, a transmitter to receive and transmit data from the ultrasonic sensor, and a proximity sensor to detect a presence of a beacon within a proximity range of the proximity sensor.

This, and other aspects, can include one or more of the following features. The proximity sensor can be a Bluetooth sensor. The Bluetooth sensor can be a Bluetooth Low Energy sensor. The transmitter can be a wireless transmitter to transmit the data from the ultrasonic sensor over a network. The monitoring unit can further include a battery to provide power to the ultrasonic sensor, transmitter, and proximity sensor. The monitoring unit can include a housing to house the ultrasonic sensor, transmitter, and proximity sensor. The monitoring unit can further include at least one magnet coupled to the housing and configured to magnetically attach the monitoring unit to an interior metallic surface of the waste oil (e.g., used cooking oil) receptacle.

In certain aspects, a fluid storage monitoring system includes a fluid storage receptacle defining an interior volume and configured to hold fluid contents, the fluid storage receptacle including a drainage fluid line, a fluid control valve in the drainage fluid line, the fluid control valve to control a fluid flow along the drainage fluid line, and a monitoring unit coupled to the fluid storage receptacle proximate a top of the fluid storage receptacle and communicably coupled to the fluid control valve. The monitoring unit includes a sensor directed vertically downward into the interior volume of the fluid storage receptacle, the sensor to detect an amount of space between the fluid contents and the sensor, a transmitter in communication with a remote server, the transmitter to receive and transmit data from the sensor and the remote server, and a controller to selectively open the fluid control valve.

This, and other aspects, can include one or more of the following features. The monitoring unit can include a proximity sensor to detect a presence of a beacon within a proximity range of the monitoring unit, and the controller can open the fluid control valve in response to the proximity sensor detecting the presence of the beacon within the proximity range. The controller can open the fluid control valve in response to a signal from the remote server. The fluid control valve can include a motorized ball valve configured to selectively open in response to a command from the controller. The fluid storage monitoring system can further include a vacuum switch in the drainage fluid line downstream of the fluid control valve, the vacuum switch being communicably coupled to the monitoring unit, the vacuum switch to detect a pressure change in the drainage fluid line downstream of the fluid control valve. The fluid storage monitoring system can further include a ventilation cap at a top of the fluid storage receptacle, the ventilation cap to control ventilation of the interior volume of the fluid storage receptacle, and the monitoring unit can be coupled to the ventilation cap. The sensor can be an ultrasonic sensor. The ultrasonic sensor can include a horn to channel ultrasonic waves from the ultrasonic sensor toward fluid contents in the interior volume of the fluid storage receptacle. The horn can be a conical horn. The monitoring unit can include at least one magnet, and the fluid storage receptacle can include an interior metallic surface, the monitoring unit to magnetically attach to the interior metallic surface of the fluid storage receptacle.

Certain aspects encompass a method for controlling a fluid storage system. The method includes attaching a monitoring unit to a fluid storage receptacle proximate a top of the fluid storage receptacle, the fluid storage receptacle configured to hold fluid contents, detecting, with a fluid level sensor of the monitoring unit, an amount of space between the fluid contents and the fluid level sensor, transmitting, with a transmitter of the monitoring unit, data from the fluid level sensor to a server, the data being representative of the amount of space between the fluid contents and the fluid level sensor, and determining, based on the transmitted data from the fluid level sensor, an operational state of the fluid storage receptacle.

This, and other aspects, can include one more of the following features. Detecting the amount of space between the fluid contents and the fluid level sensor can include detecting the amount of space over a time interval. Determining an operational state of the fluid storage receptacle can include determining that a fluid level in the fluid storage receptacle has reached a service threshold level (e.g., replacement oil threshold level), and determining that the fluid storage receptacle requires a drainage operation. The method can further include detecting a presence of a truck (e.g., service vehicle, vacuum truck, and/or other) within a proximity range of the monitoring unit, and determining the operational state of the fluid storage receptacle can include determining that the fluid storage receptacle is ready to be emptied in response to detecting the presence of the truck. Detecting a presence of a truck can include detecting, with a proximity sensor of the monitoring unit, the presence of a beacon on the truck within the proximity range of the monitoring unit. Detecting a presence of a truck can include receiving a signal from the server that the truck is within the proximity range of the monitoring unit. The method can further include opening a fluid control valve in a drainage fluid line of the fluid storage receptacle in response to detecting the presence of the truck within the proximity range. The method can further include detecting that the truck is no longer present within the proximity range of the monitoring unit, and closing the fluid control valve. The fluid control valve can include a motorized ball valve, and opening the fluid control valve can include opening the motorized ball valve. Opening the motorized ball valve can include providing power to the motorized ball valve. Attaching the monitoring unit to the fluid storage receptacle can include attaching the monitoring unit to a ventilation cap at a top of the fluid storage receptacle, the ventilation cap to control ventilation of an interior volume of the fluid storage receptacle. Attaching the monitoring unit to the fluid storage receptacle can include magnetically attaching, with at least one magnet of the monitoring unit, the monitoring unit to a metallic interior surface of the fluid storage receptacle. Transmitting data from the fluid level sensor to the server can include wirelessly transmitting the data over a network to a remote server in a location remote from the monitoring unit.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
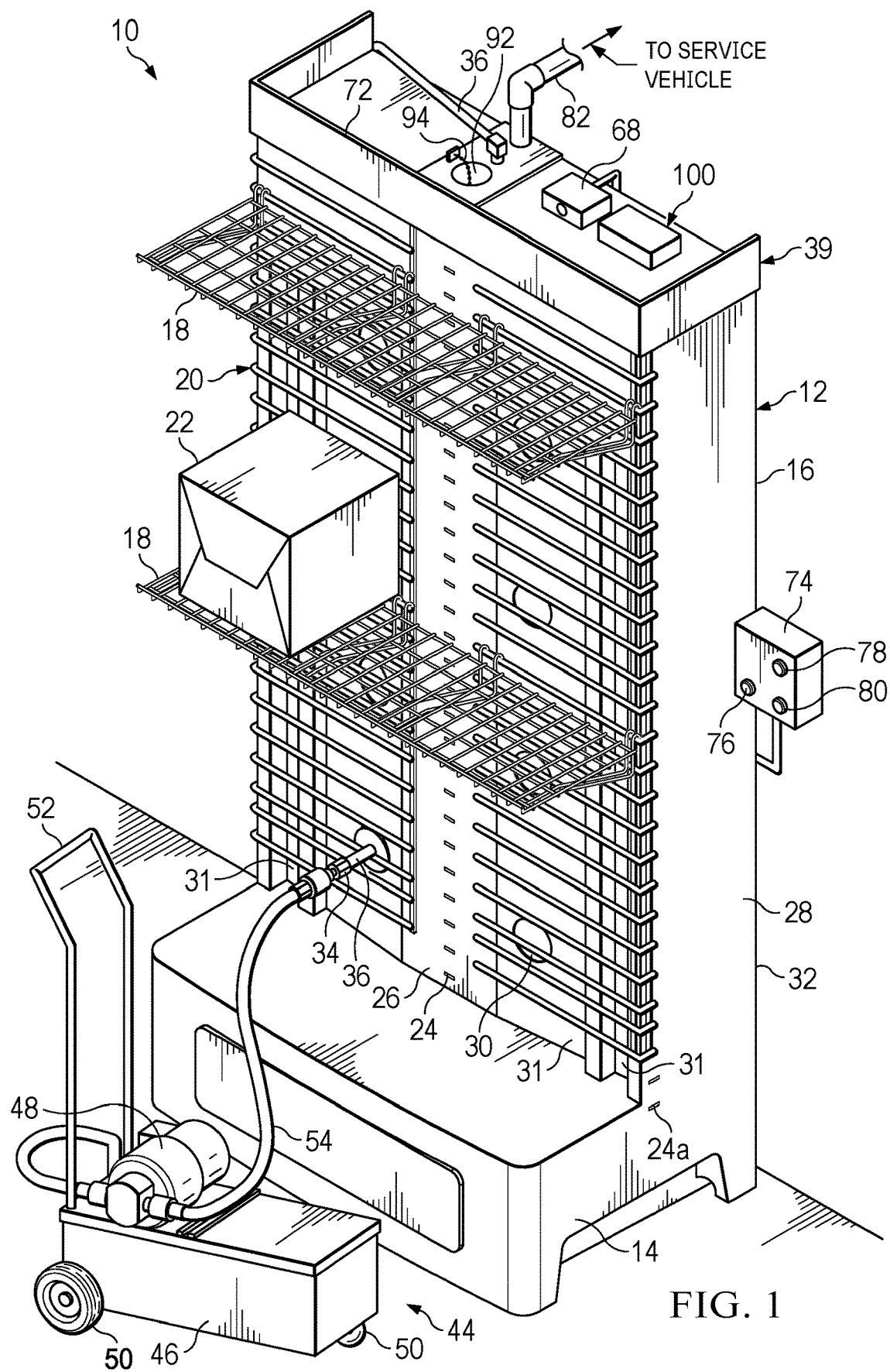
FIG. 1 is a perspective view of an example fluid storage system including a fluid storage receptacle, shelves, and a mobile storage tank.

This disclosure describes content level detection and monitoring in fluid storage receptacles, such as oil tanks for used cooking oil, and anti-theft monitoring and control of the fluid receptacles and components of the fluid receptacles. In some instances, a monitoring unit with a sensor, such as an ultrasonic sensor, is positioned on or within a fluid storage receptacle and directed at a top surface of fluid contents (e.g., oil, water, grease, and/or other materials or wastes) within the receptacle. The sensor detects a level of free space left within the tank, which is inversely related to fluid content level when the tank dimensions are known. The sensor can have a conical horn at the sensor head to better direct ultrasonic waves in a target direction (i.e., directly at a surface of the contents of the receptacle). The sensor is positioned at or near a top of the fluid receptacle, such as at the vent cap (e.g., integrally formed with or coupled to the vent cap) or magnetically coupled to a metallic surface of the oil tank within an interior of the tank, such as at a metallic upper rim of the tank or a metallic lid surface. Regardless of placement, the sensor is directed vertically downward from the top of the tank toward the tank contents in order to detect the height of the free space in the tank.

The monitoring unit has wireless capabilities and is communicably connected to a remote server, such as a central monitoring system with a data processor. Communication can occur over a network, such as in an internet-of-things (Iot)-based system. The monitoring unit can collect data from the sensor, and transmit that collected data to the central monitoring system for processing and analysis. The data collection can include edge detection at the sensor that is transmitted to the central monitoring system, though other data collection and transmission arrangements are possible. The monitoring unit can also include Bluetooth capabilities to detect and/or connect to other devices. The central monitoring system receives data from the monitoring unit and processes that data into usable data relating to content levels in the fluid receptacles. This data can be used to schedule tank content collections, detect the efficiency of tank collections (e.g., compare the amount of free space left after tank collection to known empty tank space), determine waste content (e.g., compare the detected free space after content collection to the known empty tank size), detect changes in fluid content level in real time, analyze historical data of fluid content levels to anticipate future fluid level changes and predict an efficient fluid collection schedule, a combination of these, or other features. The monitoring unit can detect fluid content level in real time, though the monitoring unit may report the data to the central monitoring system at the same real-time frequency or at a slower frequency. In some instances, the data collection frequency of the monitoring unit can be substantially real-time, and the reporting frequency (frequency in which data is reported to the central monitoring system) is different, such as a per-minute, hourly, or daily (or another frequency) reporting. In some examples, the reporting frequency is set to be a predetermined frequency, such as once a day or once an hour, but changes to a higher frequency (such as real time, per second, or per minute) in response to a triggering event. Triggering events can include detection of a vacuum truck, after a vacuum truck leaves a proximity threshold, a potential theft detection, the fluid contents reaching or exceeding a maximum or minimum threshold value, and/or other events. The monitoring unit can be powered by a long lasting battery, or powered by another power source. In some examples, the monitoring unit includes a processor to perform its own edge computing of the collected data; however, the monitoring unit can exclude a computing processor such that the monitoring unit performs edge detection and not edge computing. In certain instances, the monitoring unit also includes a controller that can control an operation of components communicably coupled to the monitoring unit, such as valves, fluid heaters, sensors, and/or other devices.

Because the monitoring unit and/or the central monitoring system can detect changes in tank content level in real time, unplanned changes in fluid content level can signal unwanted access to, or changes in, the fluid receptacle. For example, an unplanned decrease in fluid content level of the fluid receptacle can signal an attempted theft of the fluid contents, such as the used cooking oil. To differentiate between planned and unplanned decreases in fluid content level of the fluid receptacle, the location and activities of trucks with equipment to remove fluids can be tracked to associate planned fluid level decreases with the presence of a truck in the vicinity of the monitoring unit of the fluid receptacle. In some instances, these trucks can include a beacon, such as a Bluetooth beacon, that can be detected by a proximity sensor of the monitoring unit on the fluid receptacle. When fluid content levels decrease while the monitoring unit detects the beacon, then the used oil collection is, with few exceptions (e.g., theft of a beacon), a planned collection. In certain instances, the central monitoring system can track the location of the truck and send a signal to the monitoring unit that the truck is in the vicinity of the monitoring unit for collection. Although the term "truck" is used here, other types of service vehicles are considered that can perform the services described, such as fluid drainage and vacuum.

In some instances, the fluid storage system can include a controllable valve, such as a motorized valve (e.g., motorized ball valve or other actuatable valve) in the piping between the fluid receptacle and a collection point that vacuum equipment connects to. The motorized valve can be a smart valve, in that it is communicably coupled to the monitoring unit and can actuate to open the motorized valve in response to a command from the monitoring unit. For example, if the monitoring unit receives a signal that a truck is within a particular proximity range of the monitoring unit or receives a signal from a proximity sensor that a beacon on the truck is within the particular proximity range of the monitoring unit, then the monitoring unit can control the controllable valve to open. The opening of the controllable valve can be automatic in response to the signal from the monitoring unit. For example, the motorized valve only opens to allow flow of used oil from the fluid receptacle through the drainage piping when a beacon is detected or when a truck is identified as within the proximity range, thereby allowing only approved fluid collectors to access the contents of the fluid receptacle (except, for example, in the case of a beacon that is stolen). In some implementations, a vacuum switch positioned downstream of the motorized valve is communicably coupled to the monitoring unit to detect when a collection attempt is being made from the collection nozzle. For example, if the motorized valve is closed and a beacon is not detected by the monitoring unit, yet the vacuum switch is triggered, this action signifies an unwanted fluid collection attempt that can represent an attempted theft. The monitoring unit can track, in real time, these actions and notify the central monitoring system of the unwanted fluid collection attempt in real time or substantially real time.

Figure 2:
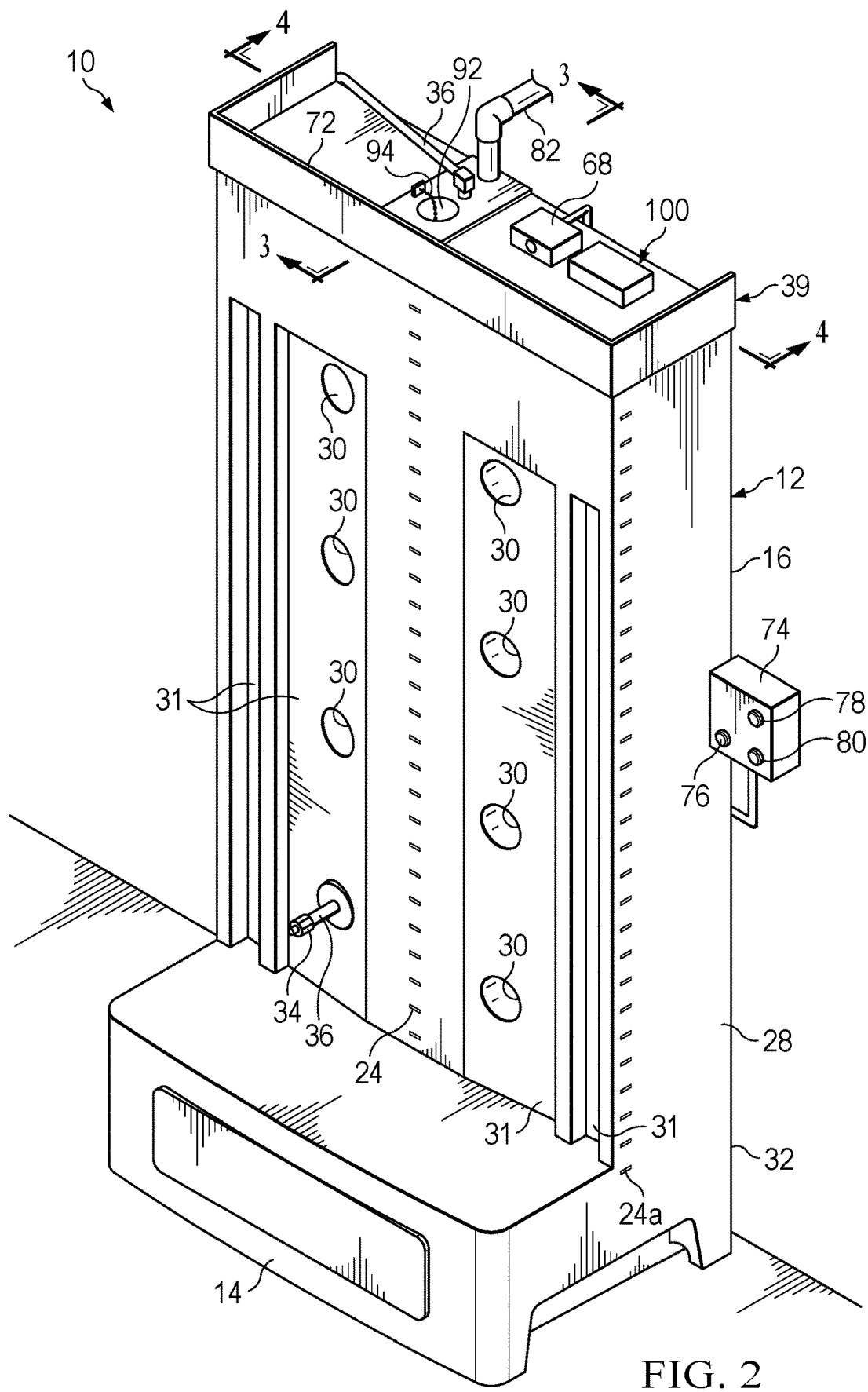
FIG. 2 is another perspective view of the example fluid storage system of FIG. 1 without the shelves and mobile storage tank.
Figure 3:
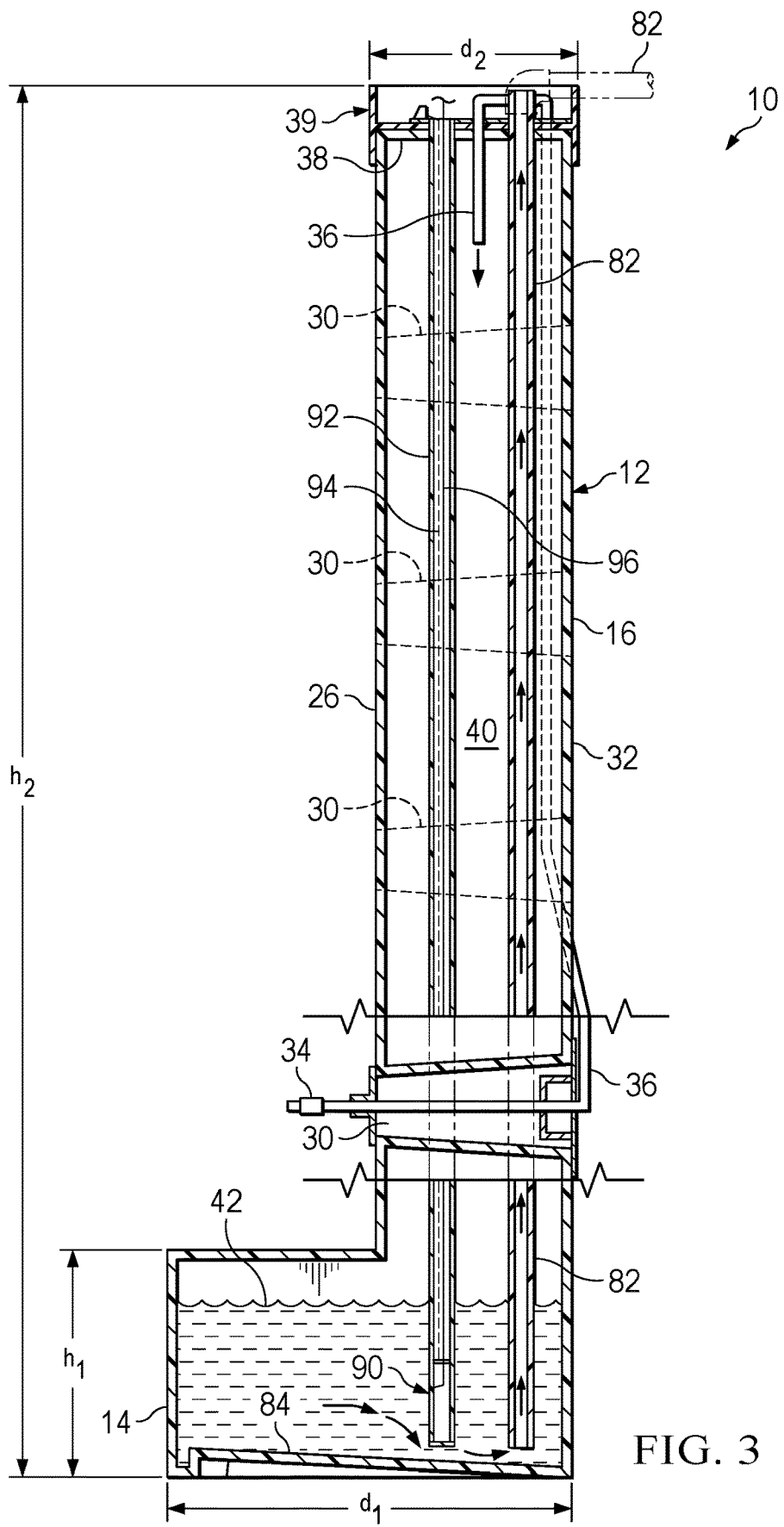
FIG. 3 is a cross-sectional side view of the example fluid storage system of FIG. 2 taken along line 3-3 of FIG. 2.
Figure 4:
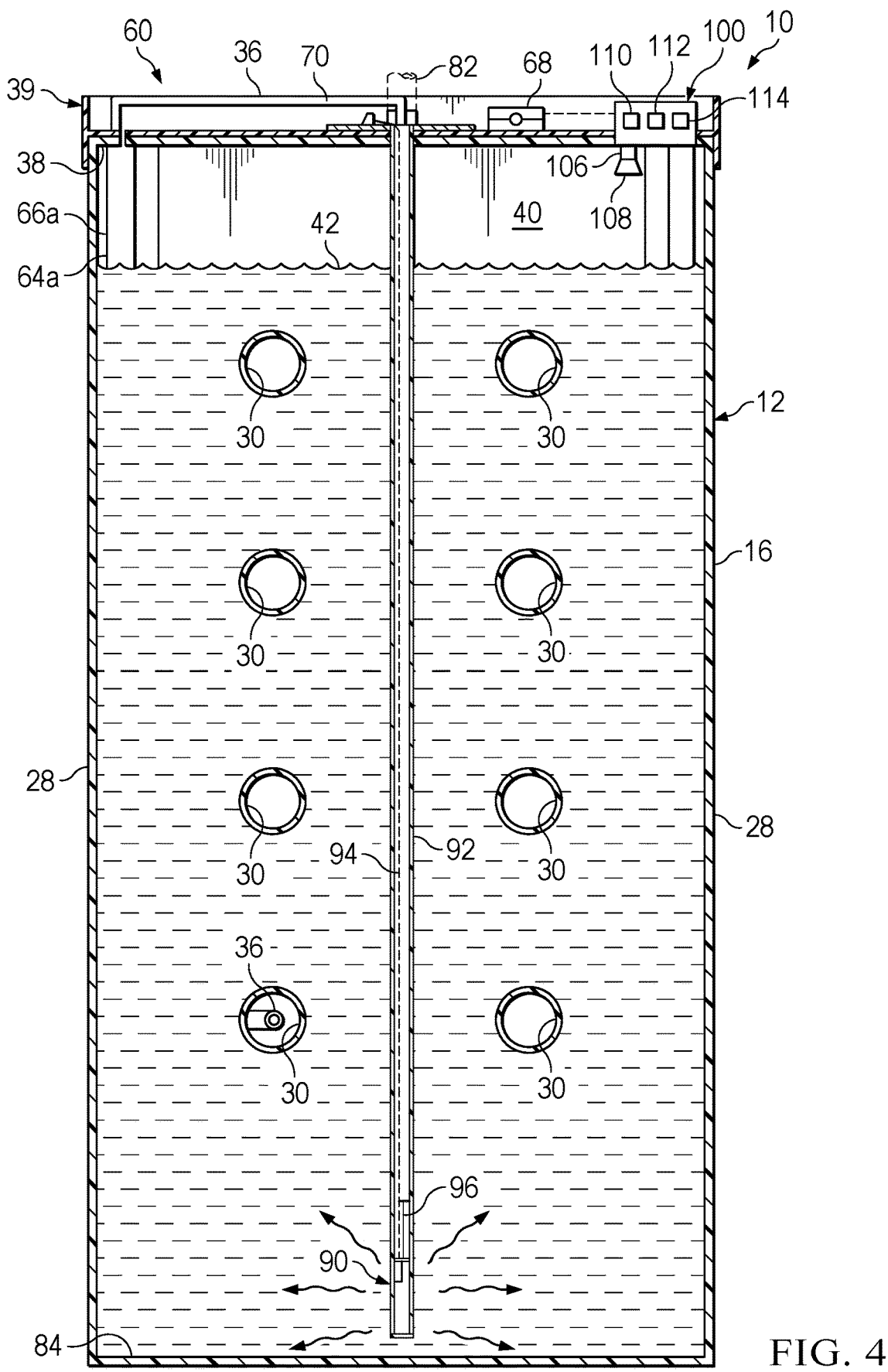
FIG. 4 is a cross-sectional rear view of the example fluid storage system of FIG. 2 taken along line 4-4 of FIG. 2.

FIGS. 1 and 2 are perspective views of an example fluid storage system 10. FIGS. 3 and 4 are cross-sectional views of the example fluid storage system 10 of FIG. 2. Referring to FIGS. 1-4, the example fluid storage system 10 includes an example fluid storage receptacle 12, such as an oil tank to store used cooking oil. The fluid storage receptacle 12 is shown as having a base section 14 and an upright section 16, though the particular shape and geometry of the fluid storage receptacle 12 can vary. In some examples, the fluid storage receptacle 12 has a substantially square, substantially rectangular, or substantially circular cross section along its entire height or the substantial majority of its height. For example, FIGS. 10A-14C are various views of example fluid storage receptacles with different dimensions and cross-sections than the example fluid storage receptacle 12 of FIGS. 1-4. The example fluid storage receptacles of FIGS. 10A-14C can be implemented in the example fluid storage system 10 of FIGS. 1-4, or in the example fluid storage system 500 of FIG. 5A, described in greater detail later. The fluid storage receptacle 12 defines an interior volume, for example, to store an amount of fluid contents. In this disclosure, fluid contents of the fluid storage receptacle 12 can include oil, water, grease, food fragments, waste, or other materials, liquids, and/or contaminants that may be present from collected and stored used cooking oil.

In the example fluid storage system 10 of FIG. 1, multiple wire shelves 18 are removably attached to the upright section 16 via a pair of vertical hangers 20 (see FIG. 2). The wire shelves 18 can provide storage space for various items or supplies 22. The wire shelves 18 can be removed and repositioned to accommodate items 22 of different sizes. The fluid receptacle 12 can be made from a number of different materials, such as from a polyethylene, for example, a high density hexane copolymer that is NSF 61 rated, a polypropylene, or other similar material that is at least partially transparent or translucent so that the liquid level in the tank 12 can be readily observed external to the tank 12. In some instances, a graduated scale 24 of one or more marked indicia or dimples, may be located on a front-facing portion 26 of the storage tank 12 so that the liquid level in the tank can be readily determined. The graduated scale 24a may additionally or alternatively be positioned on other surfaces, such as on one or both side portions 28 of the storage tank 12 as shown in FIGS. 1 and 2.

The base section 14 and upright section 16 can vary in shape and size. In some instances, constructing the base section 14 to have a larger cross-sectional area, or footprint, than the upright section 16 can provide structural stability to the fluid receptacle 12. In an example, the base section 14 is configured to contain about 100 gallons (378.5 L) of fluid contents 42, e.g., the approximate amount of used oil contained within two conventional steel drum storage tanks. The dimensions of the upright section 16 can be selected to achieve a desired additional used oil storage capacity. In this and other embodiments, the dimensions of the upright section 16 may be selected to provide a desired ratio of the cross-sectional area of the base section 14 to the cross-sectional area of the upright section 16, while providing an overall used oil storage capacity. For instance, a storage tank could be constructed to have an area ratio of 2:1 with a storage capacity of about 150 gallons (567.8 L). Alternatively, the ratio of the total height of the storage tank 12 (h2) to the height of the base section 14 (h1) may be selected to achieve a ratio of between about 4:1 and about 8:1, and advantageously between about 5:1 and about 6:1. For example, if h1 is 15 inches and h2 is 78 inches, then the ratio is 5.2:1. If the fluid receptacle 12 is 90 inches tall, then the ratio would be 6.0:1. Furthermore, other physical constraints may dictate the dimensions of the storage tank 12, such as the ceiling height of the particular restaurant or food processing facility. For example, a storage tank 12 having an overall height of 7.5 ft (2.3 m) may be configured to store 200 gallons (757.1 L) while a tank having an overall height of 6.5 ft (2.0 m) may be configured to store 175 gallons (662.4 L).

In some implementations, to facilitate the processing of filling the fluid receptacle 12 with used oil 42 (such as in FIG. 3), the fluid receptacle 12 can include a quick disconnect inlet fitting 34, which is connected to a conduit 36 (for example, a tube) that extends through one of the molded holes 30 of the storage tank 12. As shown in FIG. 3, the conduit 36 exits the molded hole 30 at the rear portion 32 of the storage tank 12 and continues to a top portion 38 of the storage tank 12. The conduit 36 enters an interior space, or volume 40, contained within the storage tank 12 via an opening in the top portion 38 (FIG. 3) and extends at least partially into the volume 40.

The top portion 38 (FIG. 3) can include a cap 39 that is configured to reside on the top portion 38 and to support one or more electronics, sensors, or liquid conduits, such as the conduit 36, as described in detail below. The cap 39 may be constructed from metallic or polymeric materials, as appropriate or desired.

When the used cooking oil in a fryer needs to be changed, the used oil is extracted from the fryer (not shown) and placed into a mobile storage tank, commonly referred to as a caddie 44, as shown in FIG. 1. The example caddie 44 includes a tank 46 and a pump 48 that is made portable via wheels 50 and a handlebar 52. A conduit 54 (i.e., tubing or hose) extends from the pump 48, which may be operated in both a fill and an empty mode. Accordingly, when the fryer needs to be emptied and cleaned, the caddie 44 is transported to the fryer and the conduit 54 is attached thereto. The pump 48 is operated in the fill mode such that the used oil moves from the fryer to the tank 46. The caddie 44 is then moved to the storage system 10 and the conduit 54 coupled to the inlet fitting 34. The pump 48 on the caddie 44 is then turned on and operated in the empty mode such that the used oil 42 (FIG. 3) is pumped through the conduit 54 of the caddie 44 and into the conduit 36 of the fluid receptacle 12. When the caddie 44 is empty, the pump 48 is turned off and the conduit 54 is disconnected from the fitting 34.

Alternatively, though not specifically shown, used oil may be directly transferred from the fryer to the storage tank 12. For example, a pump (not shown) may be included on the fryer and have a conduit that extends from the fryer to the inlet fitting 34. Operation of the pump transfers the used oil directly from the fryer to the storage tank 12.

To facilitate removing the fluid contents from the fluid receptacle 12, the fluid receptacle 12 includes an outlet conduit 82 of a drainage fluid line. The example outlet conduit 82 of the drainage fluid line is shown in FIG. 3, and continues on to a to a collection nozzle (not shown) downstream of the outlet conduit 82. In some instances, the collection nozzle is positioned adjacent to the tank, or at an exterior of a restaurant building that houses the fluid receptacle 12. The example outlet conduit 82 is shown as extending into the volume 40 of the fluid receptacle 12 to almost a bottom 84 of the fluid receptacle 12, so as to drain nearly the full volume of fluid contents 42 (e.g., used oil) from the fluid receptacle 12 during a drainage operation. In some instances, such as shown in FIG. 3, the bottom 84 may be sloped such that the outlet conduit 82 extends toward a lowered end of the bottom 84 to further facilitate draining; however, the sloped bottom is not required. While the outlet conduit 82 may exit the tank 12 at any location, the illustrative embodiment shows the outlet conduit 82 extending up to the top portion 38 where a fluid-tight seal around the outlet conduit 82 is not required. The outlet conduit 82 may be connected to one or more additional pipes, with or without valves and fittings, that are configured to couple the volume 40 of the tank 12 to a service vehicle (such as a vacuum truck) (not shown) or other mobile storage unit. The service vehicle includes a pump or vacuum (not shown) operable to pump the used oil 42 (FIG. 3) out of the storage tank 12 and into a tank of the service vehicle or mobile storage unit. In some embodiments, the service vehicle or mobile storage unit may be parked outside the building housing the storage system 10. Accordingly, the outlet conduit 82 and/or the drainage line may extend to an outside fitting or nozzle.

Under ambient conditions, some oils and grease may partially polymerize or otherwise partially solidify inside the fluid receptacle 12, making the transfer of the fluid contents 42 through the drainage line more difficult. In order to keep the fluid contents 42 in the fluid receptacle 12 in a free-flowing state (for example, a liquid state) so it can be pumped out, the fluid contents in the fluid receptacle 12 may be heated by a tank heater 90 to a predetermined temperature (for example, a melting point), such as the tank heater 90 shown in FIG. 4. In some instances, a sealed sleeve 92 extends from the top portion 38 into the volume 40 of the tank 12 and is sized to receive the tank heater 90 so that the fluid contents 42 do not directly contact the tank heater 90. A chain, rope, or other similar structure extends between the tank heater 90 and the top portion 38 for safely lowering and suspending the tank heater 90 in the sleeve 92. The tank heater 90 is electrically connected to a junction box 68 via an electrical conduit 96.

The tank heater 90 includes a heating element surrounded by a housing. Ideally, though not necessarily, the outer diameter of the housing is approximately the inner diameter of the sleeve 92 to efficiently transfer heat energy between the tank heater 90 and the used oil 42 of the tank 12. A terminal end of the heating element is coupled to a thermostat for operating the heating element. When the thermostat activates the heating element, a light (not shown) located on the control panel 74 may illuminate to indicate proper function.

The example fluid storage system 10 also includes a monitoring unit 100 coupled to the fluid storage receptacle 12 proximate to a top of the fluid storage receptacle 12. In the example system 10 of FIGS. 1-4, the monitoring unit 100 is mounted on the top portion 38. The fluid storage receptacle 12 can include one or more ventilation caps to provide ventilation to the interior volume of the storage receptacle 12, and can be a simple vent that sits on the top surface of the storage receptacle 12. In some examples, the top portion 38 of the fluid storage receptacle 12 includes a ventilation cap (not shown) at a top of the fluid storage receptacle 12, and the monitoring unit 100 is coupled to the ventilation cap. The monitoring unit can be formed integrally with the ventilation cap, or coupled directly to the ventilation cap. Attaching the monitoring unit 100 to the ventilation cap or integrating the monitoring unit into the structure of the ventilation cap provides for an easy addition of the monitoring unit to existing fluid storage receptacles without the need for customization of the fluid storage receptacle structure. The ventilation cap controls ventilation of the interior volume of the fluid storage receptacle 12, and the addition of the monitoring unit to the ventilation cap does not hinder the ventilation function of the ventilation cap. In certain instances, the monitoring unit 100 includes a magnet (not shown) that allows the monitoring unit 100 to attach to a metallic surface of the fluid receptacle 12, instead of or in addition to attachment to the ventilation cap. For example, the fluid receptacle 12 can include an interior metallic surface, such as a metal upper lip on the side periphery of the vertical portion of the fluid receptacle 12, to which the monitoring unit 100 can magnetically attached.

Figure 5A:
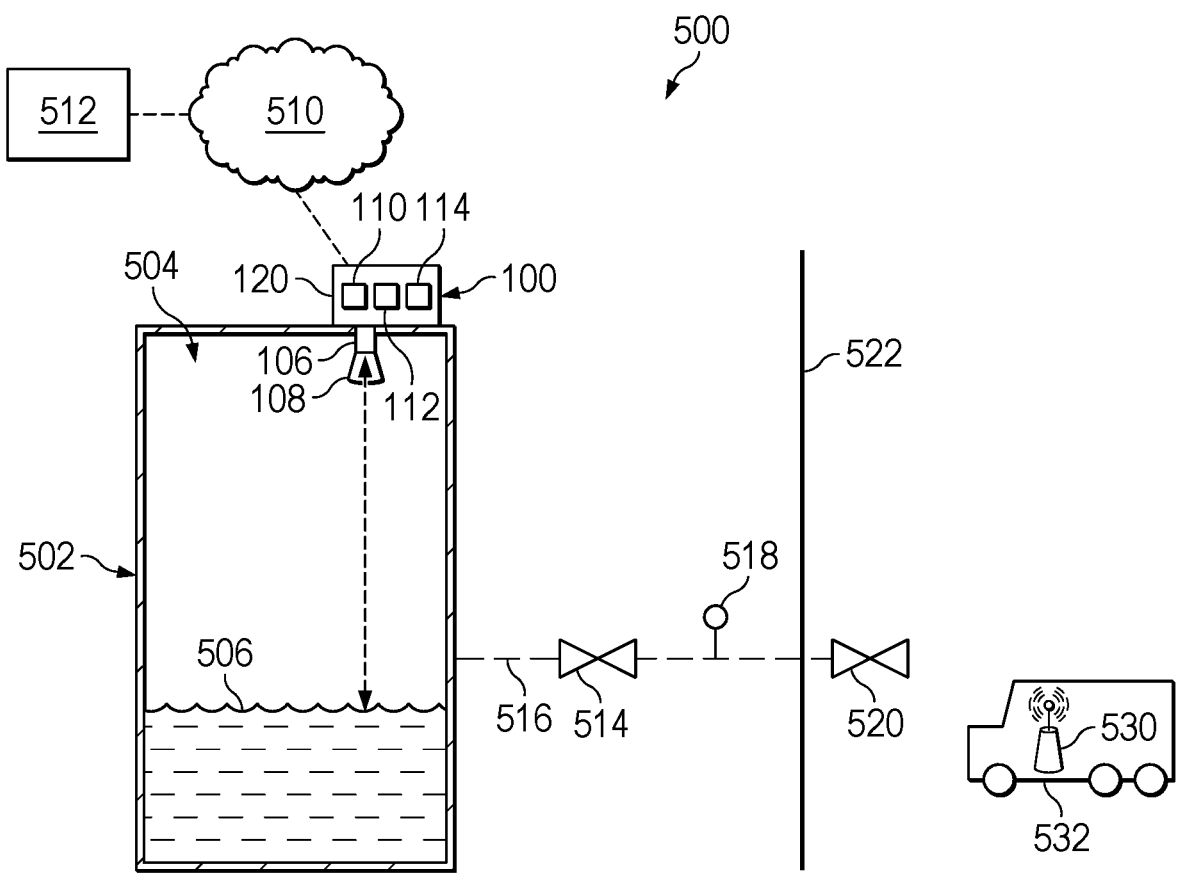
FIG. 5A is a schematic view of an example fluid storage system including a fluid storage receptacle and a monitoring unit.

FIG. 5A is a schematic view of an example fluid storage system 500 that includes a fluid storage receptacle 502. The example fluid storage system 500 and fluid storage receptacle 502 can be used in the example fluid storage system 10 and fluid storage receptacle 12 of FIGS. 1-4. The fluid storage receptacle 502 is schematically shown in FIG. 5A, however, the fluid storage receptacle 502 can include the same or similar features as the fluid storage receptacle 12 of the example fluid storage system 10 of FIGS. 1-4. The example fluid storage system 500 of FIG. 5A also includes the example monitoring unit 100. The monitoring unit 100 monitors the operational status of the fluid storage system 500, monitors fluid activity in the fluid storage receptacle 502 (e.g., fills and/or drainages of the fluid contents of the fluid storage receptacle 502), and in some instances, controls components of the fluid storage system 500 to promote efficient operation of the fluid storage system 500, promote efficient drainage operations and service operations of the fluid receptacle 502, assesses an operational state of the fluid storage system 500, monitors for attempted theft of the fluid contents from the fluid receptacle 502, a combination of these, or other benefits and operations.

The monitoring unit 100 includes a sensor 106 that is directed vertically downward into the interior volume 504 of the fluid storage receptacle 502. The sensor 106 detects an amount of space between the fluid contents 506 in the fluid receptacle 502 and the fluid level sensor 106 itself. Though the sensor 106 detects the space between the fluid contents 506 and the sensor itself 106 (as opposed to directly sensing the height of the fluid contents 506), the sensor 106 can be considered a fluid level sensor 106. Since the dimensions of the interior volume 504 of the fluid receptacle 502 (e.g., a fluid chamber formed within the fluid receptacle 502) are known and the position of the sensor 106 relative to the fluid receptacle 502 is known, sensing the distance between the fluid contents 506 and the fluid level sensor 106 provides an inverse indication of the level of the fluid contents 506 and/or the amount of fluid contents 506 in the interior volume 504 of the fluid receptacle 502. The sensor 106 can be incorporated into a vent cap of the fluid storage receptacle 502, for example, as a ready means of vertical access into the interior of the fluid storage receptacle 502. The fluid level sensor 106 of the example monitoring unit 100 is an ultrasonic sensor, where the probe of the ultrasonic sensor is oriented to face vertically downward toward the fluid contents 506. In some examples, the ultrasonic sensor includes a horn attached to a front face of the ultrasonic sensor surrounding the probe of the ultrasonic sensor. The horn can include a conical horn 108, such as shown in FIG. 5A. The horn acts to channel the ultrasonic waves from the ultrasonic sensor toward the fluid contents 506 in the interior volume 504 of the fluid storage receptacle 502, for example, to increase an accuracy and consistency of the ultrasonic sensor 106. The type of fluid level sensor 106 can vary, however. For example, the fluid level sensor 106 can include a radar sensor, guided wave radar sensor, radio frequency capacitance sensor, gravimetric sensor, hydrostatic pressure sensor, vibration sensor, capacitance sensor, weight sensor, load cells, paddle sensor, magnetic level gauge, magnetostrictive level sensor, or laser level sensor, in addition to or instead of the ultrasonic sensor.

The monitoring unit 100 includes a transmitter 110 in communication with the fluid level sensor 106 in order to receive and transmit data from the fluid level sensor 106. The transmitter 110 can transmit data through a network 510 to a server, such as a remote server in a remote location. The monitoring unit 100 can communicate (e.g., wirelessly) with a central monitoring system 512 (e.g., with the remote server) over the network 510, for example, where the central monitoring system 512 is able to receive and analyze data, interpret results from the data, and control the monitoring unit 100 and connected components in communication with the monitoring unit 100 based on the interpreted results. In some instances, the monitoring unit 100 connects to the central monitoring system 512 via an internet of things (IOT)-based network. The central monitoring system 512 can act as a computer system that receives, assesses, and analyzes data from the monitoring unit 100. In some instances, the monitoring unit 100 can include its own computing system with one or more processors to perform its own edge computing of measured data. In certain instances, the monitoring unit 100 excludes its own computing system or other computing hardware, and instead sends measured data to the central monitoring system 512 via the network 510, and the computing and analysis is performed at the central monitoring system 512. Other communication networks are envisioned, including networks that incorporate satellite communication, WiFi, Bluetooth, near field communication (NFC), and/or others.

The monitoring unit 100 also includes a controller 112 communicably coupled to the transmitter 110, and in some instances, communicably coupled to other components of the fluid storage system 500. For example, the controller 112 is in communication with controllable components of the fluid storage system 500 to control operation of the system 500. The communication can be directly wired or wireless. For example, the controller 112 can control the operation of a heating element (e.g., a heater that is suspended within the fluid contents 506 and configured, when activated, to heat the fluid contents 506 above a melting temperature of the fluid contents 506 or other threshold temperature), fluid level sensor 106, fluid control valve 514 (described later), and/or other components of the example fluid storage system 500.

In some implementations, the monitoring unit 100 also includes a proximity sensor 114. The proximity sensor 114 can detect the presence of a beacon 530 within a proximity range of the monitoring unit 100. The proximity range can vary. In some examples, the proximity range is 10 ft., 30 ft., 50 ft., 100 ft., or another dimension. Upon detection of the beacon 530 by the proximity sensor 114 (in communication with the controller 112 and/or transmitter 110), the monitoring unit 100 can perform a desired operation. For example, the monitoring unit 100 can open the fluid control valve 514 (described later) to allow fluid content flow through the drainage fluid line 516. In the example fluid storage system 500 of FIG. 5A, the beacon 530 is carried by a truck 532 such that when the beacon 530 is within the proximity range of the proximity sensor 114, the monitoring unit 100 is aware that a known truck 532 is in the vicinity of the fluid receptacle 502, for example, to perform a drainage operation of the fluid storage receptacle 502. In some instances, the beacon 530 can be carried by a service technician, such as on a mobile device or tool set, or by another authorized user or vehicle. The beacon 530 can be integrated into a component of the truck, simply carried by the truck, or otherwise attached to the truck such that detection of the beacon 530 is representative of the detection of the truck 532.

In some implementations, the proximity sensor 114 is a Bluetooth sensor and the beacon 530 is a Bluetooth beacon. In some examples, the Bluetooth sensor is a Bluetooth Low Energy (BLE) sensor. The type of proximity sensor 114 and beacon 530 can vary. For example, the proximity sensor 114 can incorporate NFC techniques, such as an NFC emitter or NFC controller that can detect an NFC tag. In some instances, built-in electronics of a truck may have its own integrated Bluetooth or NFC capabilities that can act as a beacon that is detectable by the proximity sensor 114.

In some implementations, the monitoring unit 100 excludes the proximity sensor 114. Instead, events (such as the detection of the beacon 530 or truck 532) can be monitored separately from the monitoring unit 100, and information about the events can be sent to the monitoring unit 100 from the central monitoring system 512 via the network 510. For example, the truck 532 may be tracked by the central monitoring system 512 by geo-location, and the central monitoring system 512 can send a command to the monitoring unit 100 to perform some function (e.g., open the fluid control valve 514, described later) in response to an event (e.g., the central monitoring system 512 tracking a location of the truck 532 as being within a specific proximity range of the monitoring unit 100).

In some instances, the monitoring unit 100 includes a housing 120 that houses the components of the monitoring unit 100, such as the transmitter 110, controller 112, proximity sensor 114, and/or fluid level sensor 106. The housing 120 can be formed of a resilient material to protect the components of the monitoring unit 100 in potentially elevated temperatures or other caustic environments, while also not disrupting wireless communication from the transmitter 110 and/or proximity sensor 114. The monitoring unit 100 is mounted to a surface of the fluid receptacle 502, for example, at a top lid surface, an interior sidewall surface, or another surface that allows the fluid level sensor 106 to be positioned so that it faces vertically downward toward the fluid contents 506. In some implementations, the monitoring unit 100 includes a magnet (not shown) fixed to the housing 120, and the magnet allows the monitoring unit 100 to magnetically attach to a metallic surface of the fluid receptacle 502, instead of or in addition to attachment to a ventilation cap or other surface of the fluid receptacle 502. For example, the fluid receptacle 502 can include an interior metallic surface, such as a metal upper lip on the side periphery of the vertical walls of the fluid receptacle 502, to which the magnet of the housing 120 of the monitoring unit 100 can magnetically attach.

Figure 5B:
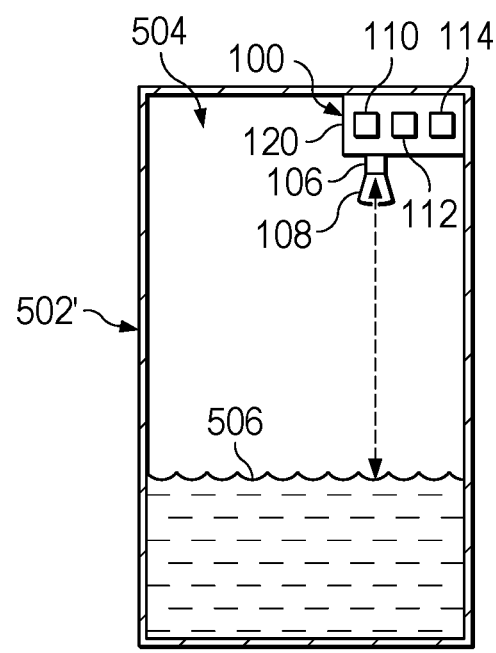
FIG. 5B is a schematic view of an example fluid storage receptacle and example monitoring unit that can be used in the example fluid storage system of FIG. 5A.

In the example fluid storage system 500 of FIG. 5A, the monitoring unit 100 is positioned on a top surface of the receptacle 502, such as mounted on a top lid surface with the sensor 106 positioned within the interior chamber of the fluid receptacle 502. In some examples, the monitoring unit 100 is positioned partially or entirely within the interior chamber of the fluid receptacle 502. For example, FIG. 5B is a schematic view of an example fluid storage receptacle 502' with the example monitoring unit 100 mounted on an interior surface (e.g., interior top surface or side surface) of the fluid storage receptacle 502'. The example fluid storage receptacle 502' of FIG. 5B can be used in the example fluid storage system 500 of FIG. 5A, where the monitoring unit 100 is positioned entirely within the fluid storage receptacle 502 instead of partially within or entirely outside of the interior fluid chamber of the fluid storage receptacle. Positioning the monitoring unit 100 mostly or entirely within the fluid storage receptacle 502' can reduce a chance of access or theft of the monitoring unit 100 from the exterior of the tank. In examples of an exterior fluid storage receptacle, positioning the monitoring unit 100 within the fluid storage receptacle itself allows for protection of the monitoring unit 100 from exterior conditions (e.g., weather, theft, and/or other).

The components of the monitoring unit 100 are powered by a battery housed within the housing 120. The battery can be a long lasting battery (e.g., configured to provide power for an extended period of time, such as up to 5 to 10 years) connected to the sensor 106, transmitter 110, controller 112, and/or proximity sensor 114. Including a battery in the monitoring unit 100 allows the monitoring unit to operate as a substantially standalone device without the need for a powered connection or other integration into existing systems of the fluid receptacle 502. In some implementations, the monitoring unit 100 can connect to a different power source to provide power to its components, such as an AC or DC power source.

In some examples, the monitoring system 100 includes or connects to an alarm, for example, that can be activated during a theft attempt, a leak in the fluid receptacle 502, a fluid content level exceeding a threshold, or other operations. In certain instances, the alarm can be activated during a detected theft attempt in order to thwart the attempted theft of fluid contents.

In some implementations, the fluid storage system 500 includes a fluid control valve 514 in the drainage fluid line 516. The fluid control valve 514 controls the flow of fluid contents 506 from the fluid receptacle 502 along the drainage fluid line 516. The drainage fluid line 516 acts to fluidly connect the fluid receptacle 502 with the nozzle 520, for example, to allow a user or pump to perform a drainage operation of the fluid contents 506 of the fluid receptacle 502 by accessing the nozzle 520 and pumping the fluid out of the fluid receptacle 502. The fluid control valve 514 can be opened to allow fluid flow, and can be closed to shut off fluid flow through the drainage fluid line 516. The fluid control valve 514 is a smart valve, in that it is communicably coupled to the monitoring unit 100 and can be opened and closed based on a command from the monitoring unit 100. The fluid control valve 514 is operated automatically such that it opens to allow fluid flow along the drainage fluid line 516 during a known drainage operation of the fluid receptacle 502, and remains closed to prevent fluid flow along the drainage fluid line 516 during unknown or unwanted drainage operation attempts. Unknown or unwanted drainage operation attempts may include an attempted theft of fluid at the nozzle 520.

In some examples, the fluid control valve 514 excludes a manual crank to open and close the fluid control valve 514. In these examples, the fluid control valve 514 opens only in response to a command from the monitoring unit 100, which can prevent or reduce theft of the fluid contents from the fluid receptacle 502 via the drainage fluid line 516. In certain instances, such as in the example fluid storage system 500 of FIG. 5A, the fluid receptacle 502 and fluid control valve 514 is separated from the nozzle 520 by a wall 522. In some examples, the fluid storage receptacle 502 and fluid control valve 514 are stored inside a building, such as in a locked restaurant, such that only the nozzle 520 is readily accessible by someone attempting to access the fluid contents via the drainage fluid line 516. In other instances, the exterior wall 522 is not present, such as in instances where the fluid receptacle 502 is an exterior storage tank. In some instances, the fluid receptacle 502 is an exterior storage tank, excludes a drainage fluid line 516, and the fluid contents within the interior volume 504 are accessed, for example, through a lid on the fluid receptacle 502.

The fluid control valve 514 can include a motorized ball valve that selectively opens and closes, for example, in response to a command from the monitoring unit 100. The opening and closing of the motorized ball valve can be automatic based on the command from the monitoring unit 100. In some instances, the motorized ball valve opens in response to the proximity sensor 114 detecting the presence of the beacon 530. For example, a drainage operation of the fluid receptacle 502 can occur because the fluid control valve 514 is opened when a known truck 532 is in a specific proximity range of the monitoring unit 100, whereas the fluid control valve 514 is closed when a known truck 532 is not in specific proximity range of the monitoring unit 100. In certain examples, after the fluid control valve 514 is opened, the fluid control valve 514 can be closed after a specific time delay (e.g., 0 minutes, 5 minutes, 10 minutes, or another time delay) after a known truck is no longer within the proximity range of the monitoring unit 100.

The example fluid storage system 500 also includes a vacuum switch 518, or pressure switch, in the drainage fluid line 516 downstream of the fluid control valve 514. The vacuum switch 518 is also communicably coupled to the monitoring unit 100, such that activation of the vacuum switch (for example, in response to a pressure change downstream of the fluid control valve 514) can be monitored by the monitoring unit 100. The vacuum switch 518 detects the pressure in the drainage fluid line 516 downstream of the fluid control valve 514, and triggers when the pressure drops below a specific pressure threshold (e.g., at or near atmospheric pressure). Triggering of the vacuum switch 518 signifies a drainage attempt from the nozzle 520, for example, since draining fluid at the nozzle 520 may include a pumping operation. If the vacuum switch 518 is triggered when the fluid control valve 514 is closed and when a known truck 532 is not in the proximity range of the monitoring unit 100, the monitoring unit 100 can identify the triggering as an attempted drainage theft.

The fluid control valve 514, the vacuum switch 518, or both the fluid control valve 514 and vacuum switch 518 can be integrated into the structure of the fluid receptacle 502, such as built into or coupled to a wall of the fluid receptacle 502. In other implementations, the fluid control valve 514, the vacuum switch 518, or both the fluid control valve 514 and vacuum switch 518 are not directly coupled to the fluid receptacle 502, such as schematically shown in FIG. 5A.

The monitoring system of the example fluid storage system 500 can assess an operational state of the fluid receptacle 502 and other components of the fluid storage system 500, manage the fluid storage system 500 to promote efficient and secure drainage operations and other operations, and/or detect and prevent (or deter) attempted theft of fluid contents in the fluid receptacle 502. The fluid level sensor 106 can track the fluid content level in the fluid receptacle 502 over time, during filling operations, and/or during drainage operations, to track the amount of the fluid contents (or, track the amount of space between the fluid contents and the sensor 106). Tracking the fluid content level can help in scheduling drainage operations, for example, by monitoring when the fluid content level reaches a maximum level threshold (or when a measured free space reaches a minimum level threshold) and monitoring the trends and frequency in which the fluid content changes (e.g., waste oil additions from a fryer). Based on the monitored data, a drainage operation can be scheduled to maximize the efficiency of the scheduled drainage. For example, an operational state of the fluid storage receptacle 502 can be based on the measured data from the fluid level sensor 106. Determining an operational state of the fluid storage receptacle can include determining that a fluid level of the fluid contents has reached a service threshold level (e.g., a replacement threshold level), and determining that the fluid storage receptacle 502 requires a drainage operation or other service.

The monitoring unit 100 can also monitor the fluid content level (or free space above the fluid content level) to determine whether increases in free space (i.e., fluid level decreases) occur during known drainage events. If these increases in free space occur when a drainage operation is not scheduled to take place, then the monitoring unit can track that free space increase, and notify the central monitoring system 512. These increases in free space may signify a leak in the fluid receptacle 502, an off-schedule drainage operation (e.g., drainage operation earlier than expected, or drainage operation later than expected), or a theft of the fluid contents of the fluid receptacle 502. The monitoring unit 100 can detect these changes and assess a response strategy in real time in order to address the operational changes in the fluid receptacle 502. For example, if the fluid control valve 514 is (inadvertently) open during an unscheduled increase in free space, then the monitoring unit 100 can close the fluid control valve 514, all without a user having to physically travel to and close the fluid control valve 514. In another example, if the increase in free space is determined to be a theft, then the monitoring unit 100 and/or the central monitoring system 512 can notify local police authorities, activate a camera or other recording device directed at the fluid receptacle 502 and/or other components of the system 500 (e.g., the nozzle 520), activate an alarm (e.g., an audible alarm at the fluid receptacle 502 or nozzle 520) to deter the theft, and/or initiate other anti-theft measures.

In some instances, the monitoring unit 100 can detect the presence of a truck 532 as within a proximity range of the monitoring unit 100 (e.g., based on the beacon 530 or based on location tracking from the central monitoring system 512), and the monitoring unit can prepare the fluid receptacle for a drainage operation, for example, by opening the fluid control valve 514. Once the drainage operation is complete and the truck 532 is no longer within the proximity range of the monitoring unit 100, the monitoring unit 100 can close the fluid control valve 514.

In some instances, a heating element is recommended or required in order to heat the fluid contents 506 in the fluid receptacle 502 such that the fluid contents are substantially or completely in liquid form. The process of heating the fluid contents to its melting temperature can take minutes, hours, or days based on the properties of the fluid contents. If the fluid contents are not sufficiently heated, the solidified portions may restrict flow or plug flow of the fluid through the drainage fluid line 516 during a drainage operation. In some instances, to prevent and deter theft, the heating unit remains idle or off (i.e., does not heat the fluid contents 506), and is turned on at some predetermined time interval (e.g., a specific number of minutes, hours, or days) before a scheduled drainage operation such that the fluid contents 506 reach a substantially liquid form at about the same time that the drainage operation is scheduled to be performed. In these instances, attempted theft of the fluid contents before the scheduled drainage operation may be prevented or reduced simply by the fluid contents being partially solidified and plugging the drainage fluid line 516, thereby not being able to sufficiently drain through the drainage fluid line 516.

The monitoring unit 100 can also monitor the free space in the fluid receptacle 502 during a scheduled drainage operation to determine the efficiency and completeness of the drainage operation. Real-time monitoring of the rate of change in the free space and the total change in the free space during the scheduled drainage operation can provide insight into the efficiency and completeness of a drainage operation when comparing to a known maximum flow rate and known maximum free space of the fluid receptacle 502. For example, a measured flow rate that is different from a known maximum flow rate can signify a partial or total blockage of the drainage fluid line 516, and the measured free space after a drainage operation compared to a maximum free space of the fluid receptacle 502 can signify an incomplete drainage of the fluid receptacle 502, an excess buildup of material or waste in the fluid receptacle, a blockage of the drainage fluid line 516, a combination of these, or another assessed result. This assessment can be determined by the monitoring unit 100, the central monitoring system 512, or both, and a solution (e.g., fluid receptacle 502 maintenance or replacement) can be determined based on the received data from the monitoring unit 100.

Figure 6:
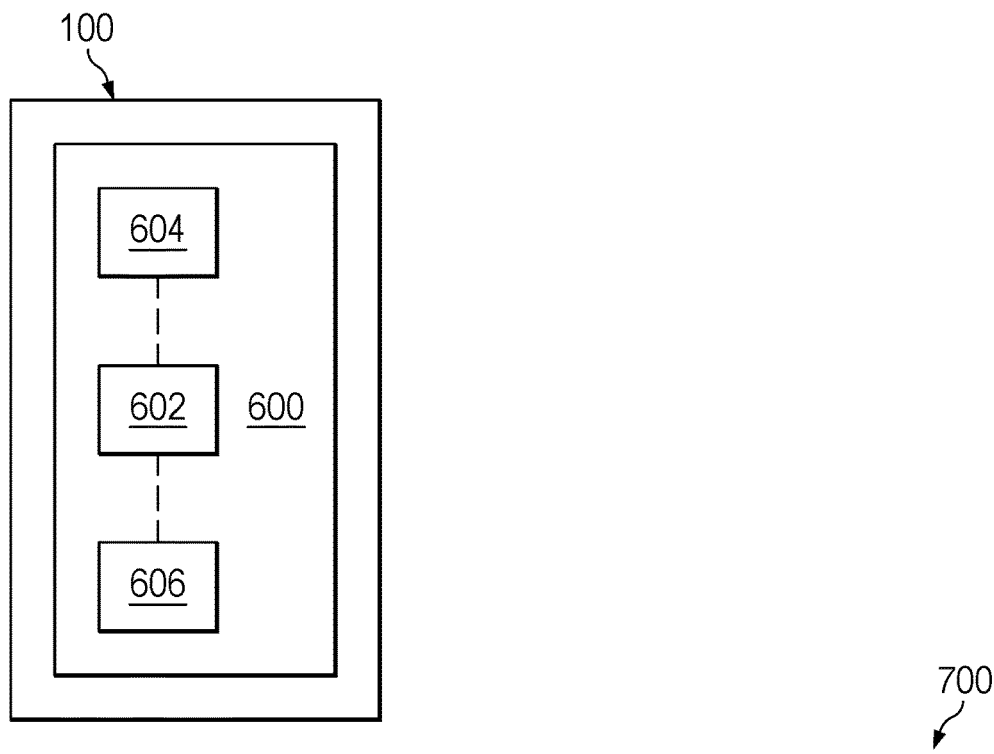
FIG. 6 is a block diagram of an example controller that can be used with aspects of the monitoring unit of FIGS. 1-5B.

FIG. 6 is a block diagram of an example controller 600 that can be used with aspects of the monitoring unit 100 of FIGS. 1-5B. For example, the example controller 600 can be used in the controller 112 of the fluid storage system 500 of FIG. 5A. The controller 600 can include one or more processors 602 and non-transitory memory 604 including instructions to facilitate sending and receiving signals through an input/output (I/O) interface 606. The controller 600 can communicate with components of the system 500, for example, including the fluid control valve 514, heating element within the fluid receptacle 502, fluid level sensor 106, transmitter 110, proximity sensor 114, vacuum switch 518, a combination of these elements, or other elements of the system 500.

Figure 10A:
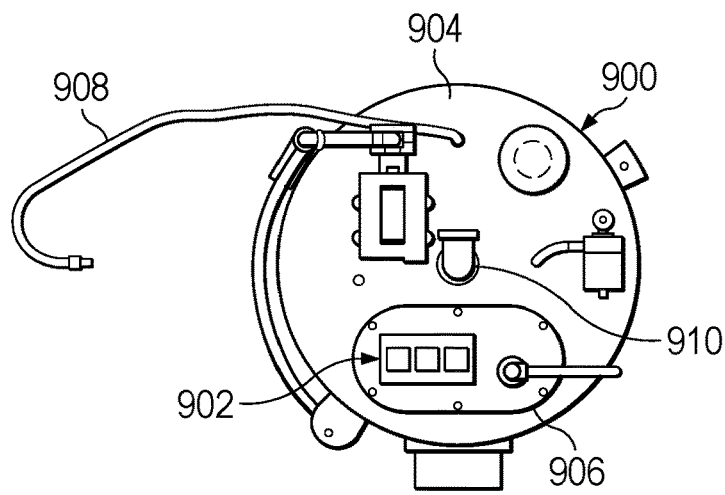
FIGS. 10A-10C are a top view a front view, and a side view, respectively, of an example fluid receptacle with a substantially circular cross-section and including an example monitoring unit.
Figure 10B:
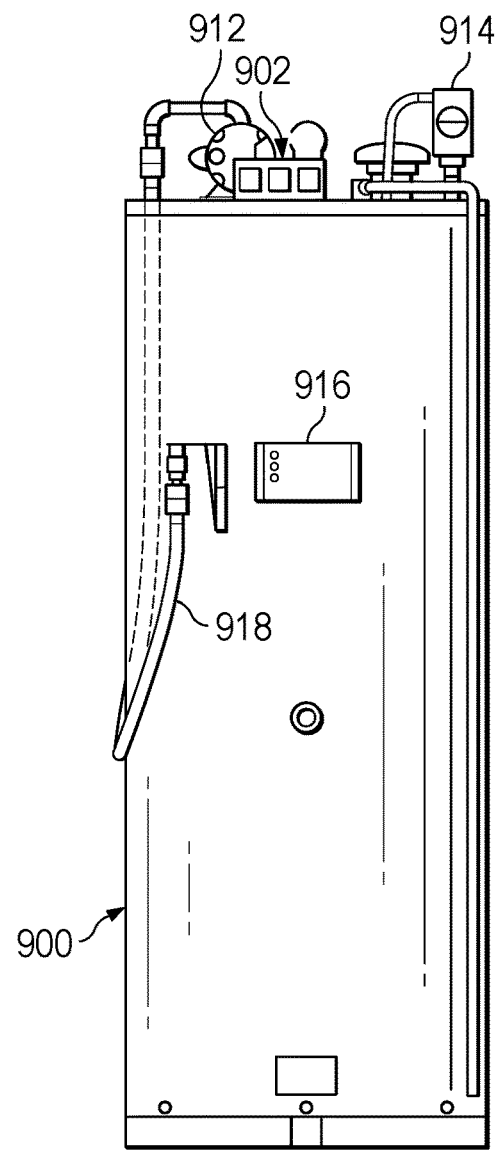
Figure 10C:
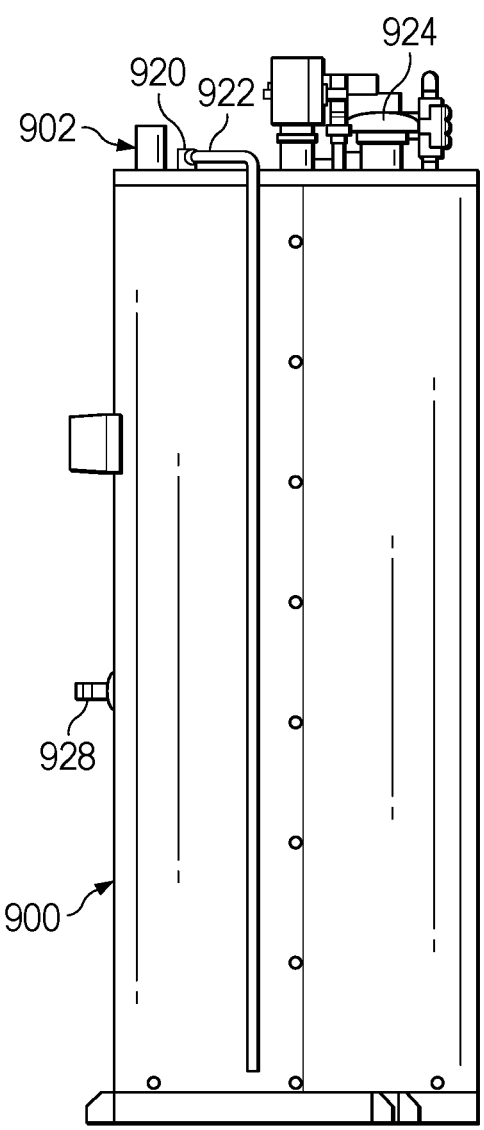
Figure 11A:
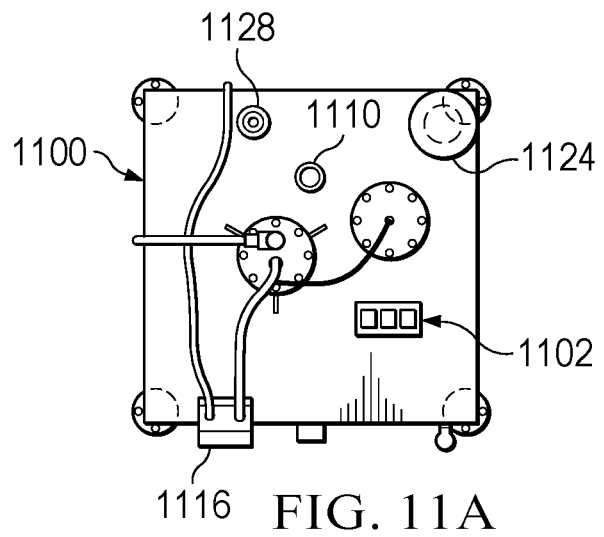
FIGS. 11A-11D are a top view, a left side view, a front view, and a right side view, respectively, of an example fluid receptacle with a substantially square cross-section and including an example monitoring unit.
Figure 11B:
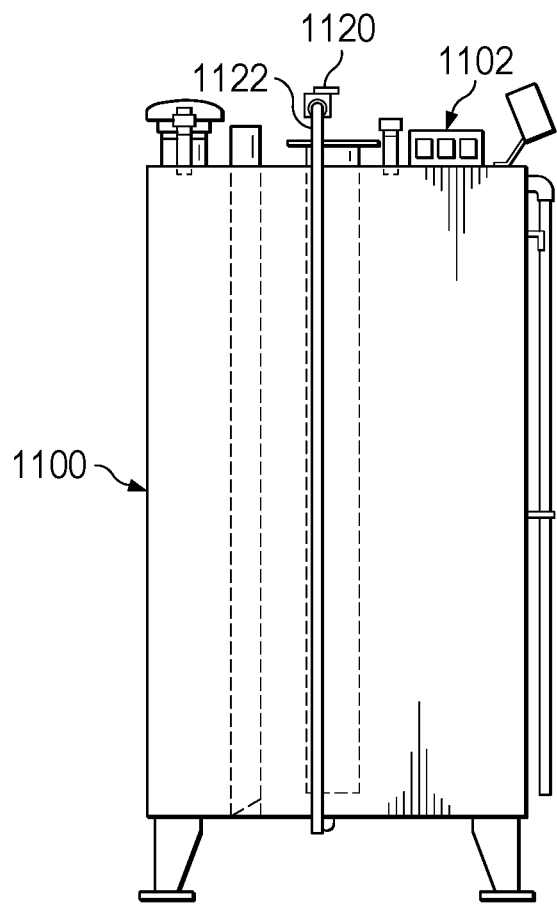
Figure 11D:
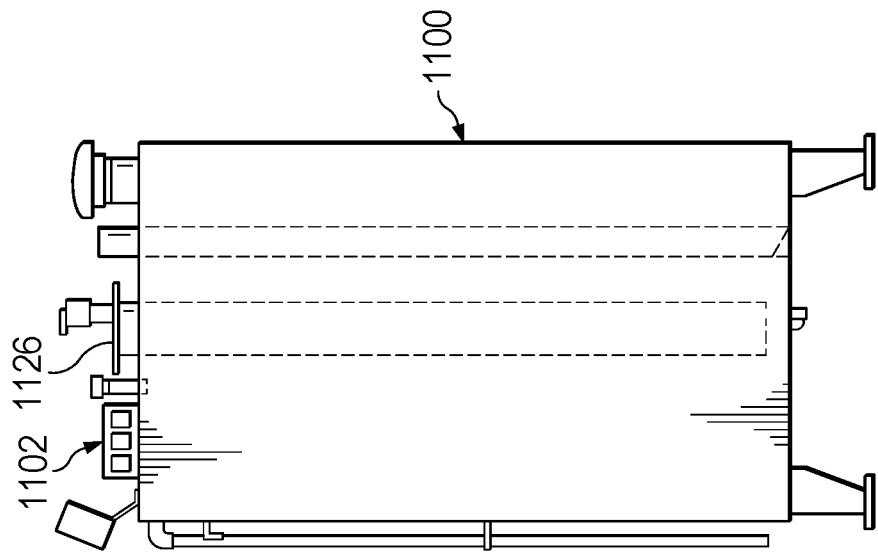
Figure 11C:
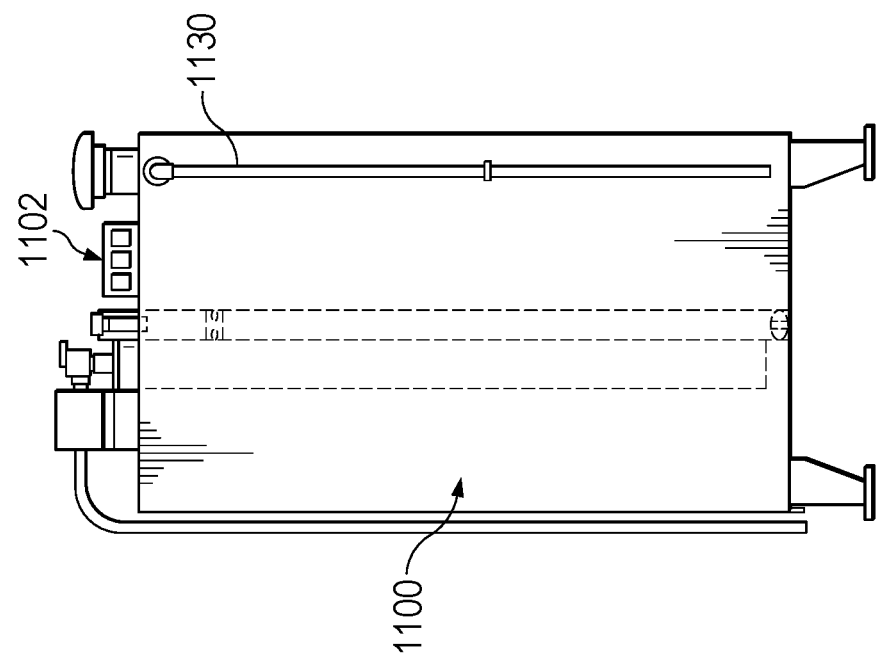

As described earlier, the size, shape, and cross-sectional area of the fluid receptacle 502 can vary. For example, the fluid receptacle 502 of FIG. 5A (or the fluid receptacle 502' of FIG. 5B) can have a size, shape, and cross section similar to the fluid receptacle 12 of the example fluid storage system 10 of FIGS. 1-4, or the fluid receptacle 502 can have a different size, shape, and cross-section. FIGS. 10A-10C are a top view, a front view, and a side view, respectively, of an example fluid receptacle 900 with a substantially circular cross-section and including an example monitoring unit 902. In some instances, the example fluid receptacle 900 includes a lid 904 that can be removable or permanently affixed to a body of the receptacle 900, and an access cover 906 coupled to the lid 904, where the access cover 906 can be removable or pivotable for access into an interior of the receptacle 900. In some examples, the example monitoring unit 902 is mounted on the access cover 906 with access to an interior chamber of the receptacle 900. In certain instances, the example fluid receptacle 900 also includes a power cord 908 for powering certain components of the fluid receptacle 900, an evacuation valve conduit 910, a pump 912, an electric ball valve 914, a control panel 916, a hose 918 (e.g., between the pump 912 and an interior of the receptacle 900), a pressure relief valve 920 in the lid 904, and/or a tubular relief valve 922 (e.g., for excess or runoff contents in the receptacle 900). The example receptacle 900 may include fewer or additional components, such as additional vents 924 (one shown) for venting an interior chamber of the receptacle 900 and/or a fill port 928.

FIGS. 11A-11D are a top view, a left side view, a front view, and a right side view, respectively, of an example fluid receptacle 1100 with a substantially square cross-section and including an example monitoring unit 1102. In some instances, the example fluid receptacle 1100 excludes a removable lid, and has the example monitoring unit 1102 mounted on a top surface of the example receptacle 1100 with access to an interior chamber of the receptacle 1100. In certain instances, the example fluid receptacle 1100 includes an evacuation valve conduit 1110, a pump, a control panel 1116, a pressure relief valve 1120, and/or a tubular relief valve 1122 (e.g., for excess or runoff contents in the receptacle 1100). The example receptacle 1100 may include fewer or additional components, such as additional vents 1124 (one shown) for venting an interior chamber of the receptacle 1100, a heater 1126, fill conduit 1128, and/or overflow tubing 1130.

Figure 12A:
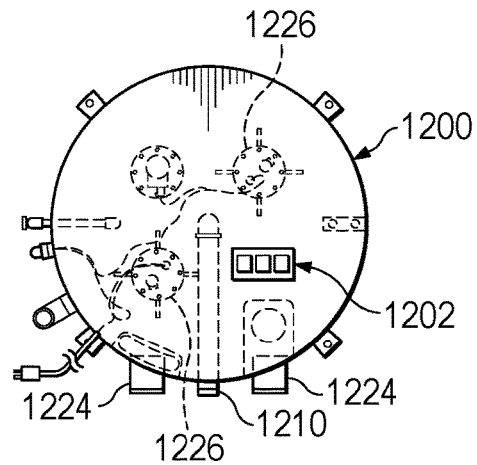
FIGS. 12A-12C are a top view, a front view, and a cross-sectional side view, respectively, of another example fluid receptacle with a substantially circular cross-section and including an example monitoring unit.
Figure 12B:
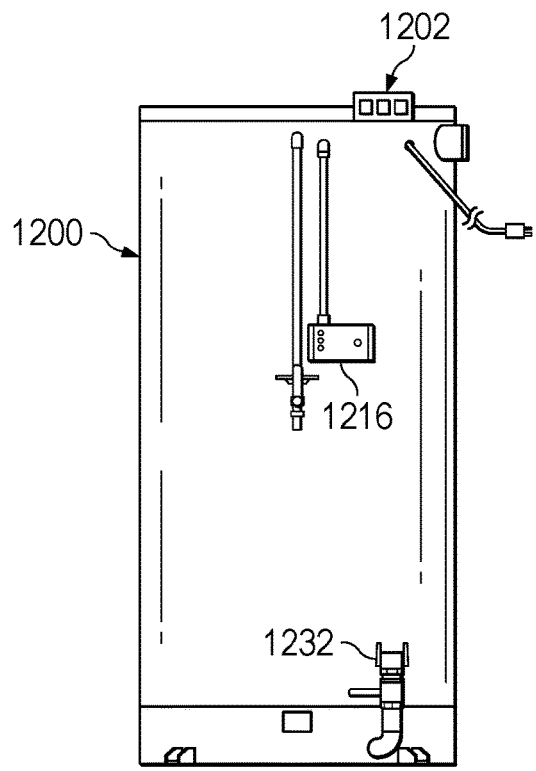
Figure 12C:
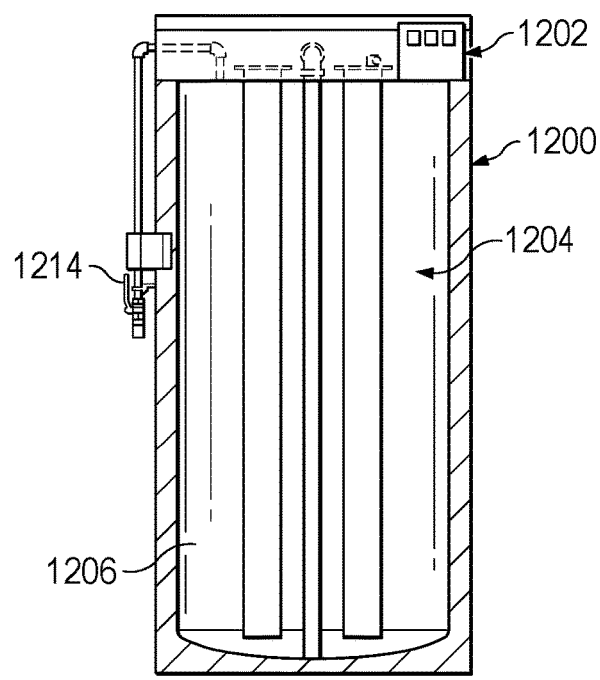
Figure 13A:
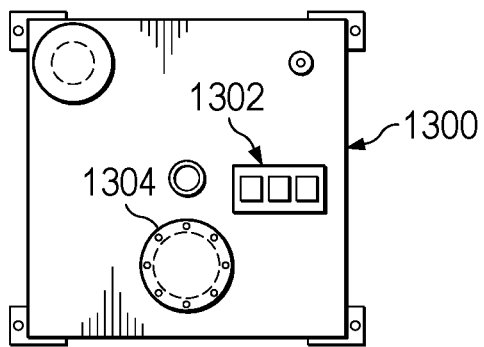
FIGS. 13A-13D are a top view, a left side view, a front view, and a right side view, respectively, of another example fluid receptacle with a substantially square cross-section and including an example monitoring unit.
Figure 13B:
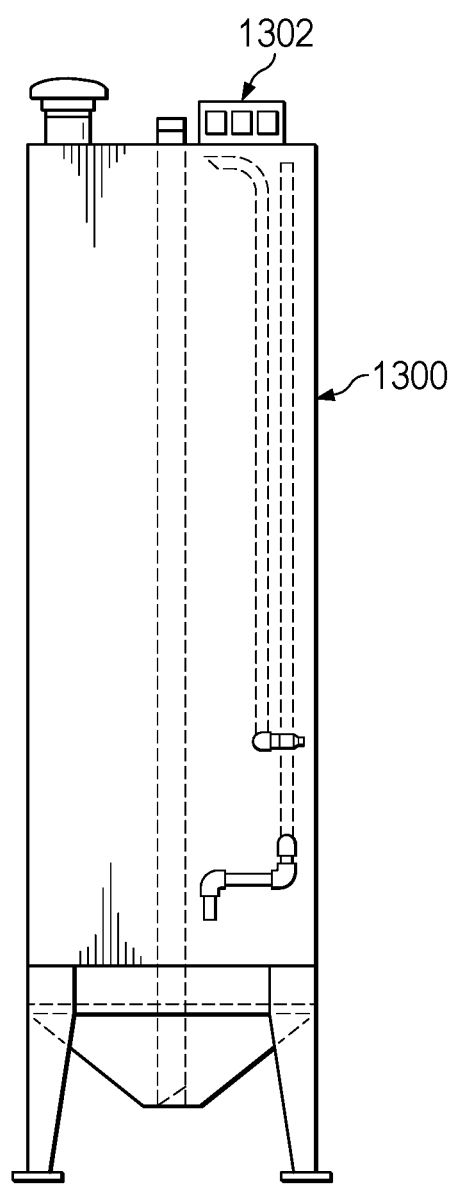
Figure 13C:
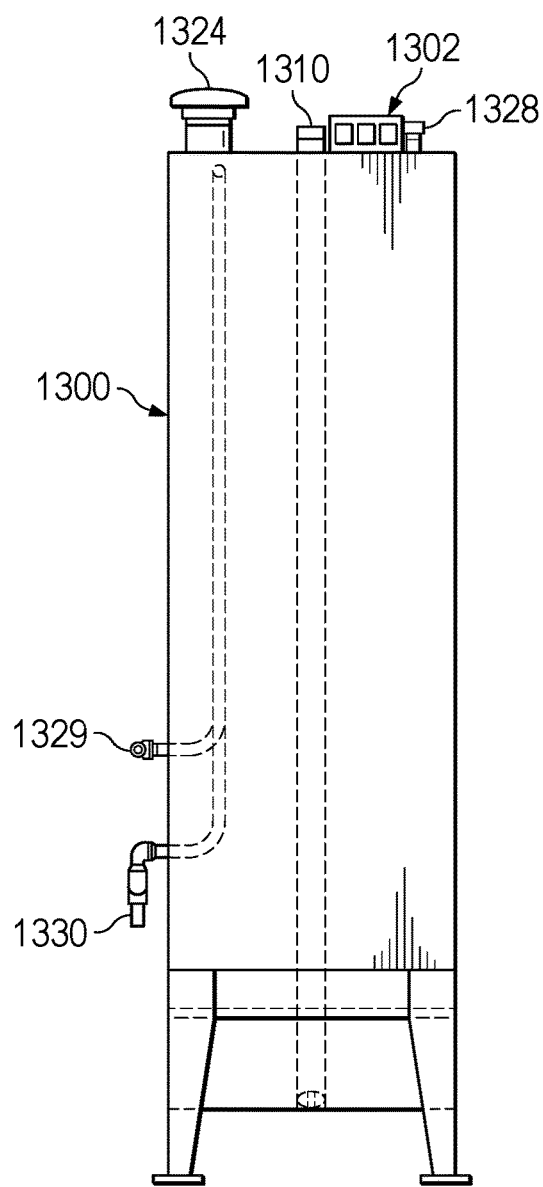
Figure 13D:
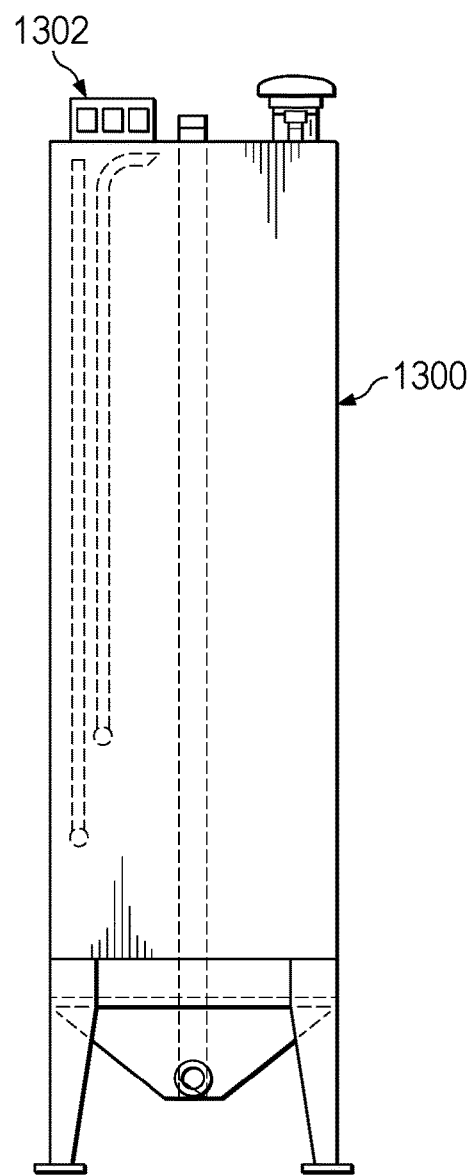

FIGS. 12A-12C are a top view, a front view, and a cross-sectional side view, respectively, of another example fluid receptacle 1200 with a substantially circular cross-section and including an example monitoring unit 1202. In some instances, the example fluid receptacle 1200 includes a primary tank 1204 and a secondary tank 1206 within the same fluid receptacle 122, for example, for storing separate fluids or for keeping two fluids separate from each other. The example fluid receptacle 1200 can include a removable lid, with the example monitoring unit 1202 mounted on a top surface of the lid with access to the interior of the primary tank 1204, secondary tank 1206, or both the primary tank 1204 and secondary tank 1206 of the receptacle 1200. In certain instances, the example fluid receptacle 1200 includes an evacuation valve conduit 1210, one or more pumps, a fill and ball valve 1214, a control panel 1216, a pressure relief valve, and/or a tubular relief valve (e.g., for excess or runoff contents in the receptacle 1200). The example receptacle 1200 may include fewer or additional components, such as additional vents 1224 (two shown) for venting an interior chamber of the primary tank 1204 and/or secondary tank 1206 of the receptacle 1100, a heater 1226, fill conduit, overflow tubing, and/or cleanout tubing 1232.

Figure 14A:
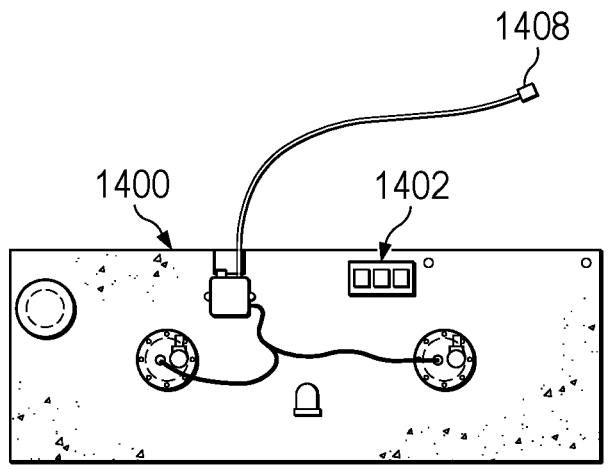
FIGS. 14A-14C are a top view, a front view, and a side view, respectively, of an example outdoor fluid receptacle with a substantially rectangular cross-section and including an example monitoring unit.
Figure 14B:
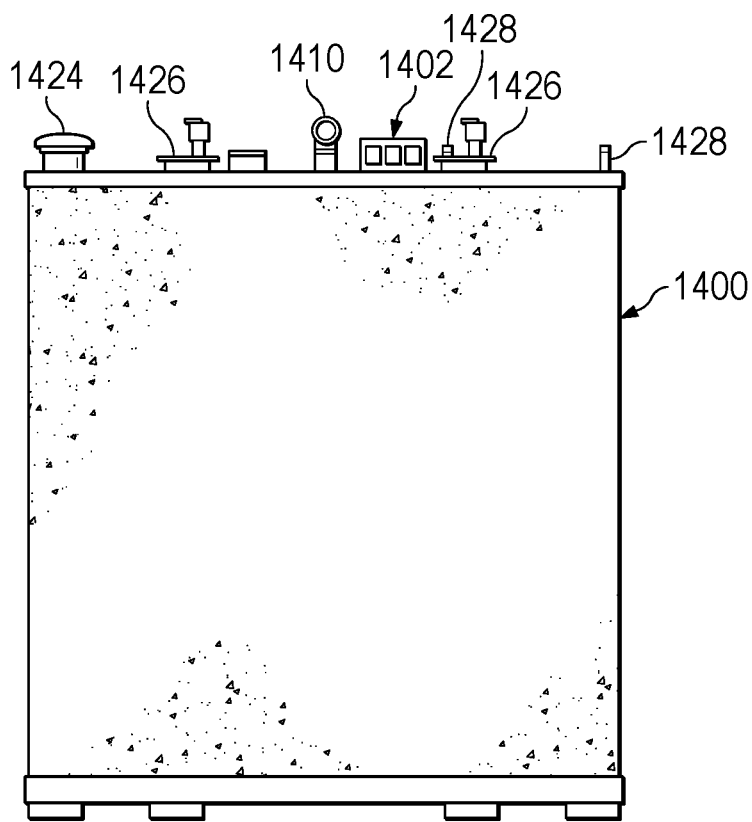
Figure 14C:
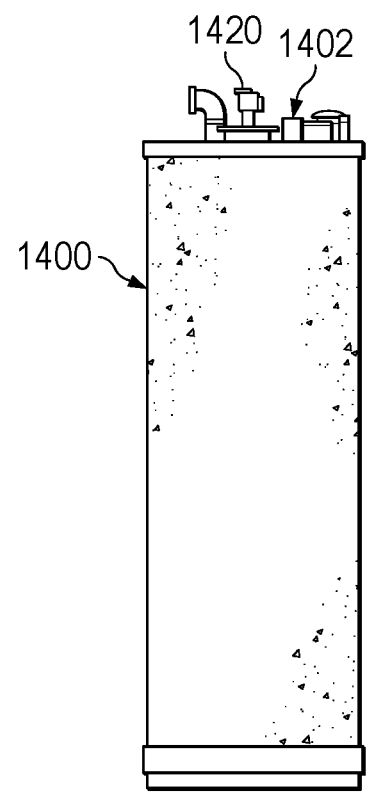

FIGS. 13A-13D are a top view, a left side view, a front view, and a right side view, respectively, of another example fluid receptacle 1300 with a substantially square cross-section and including an example monitoring unit 1302. In some instances, the example fluid receptacle 1300 includes an access port 1304, evacuation conduit 1310, fill port 1328, fill tubing 1329, overflow tubing 1330, and/or vents 1324. FIGS. 14A-14C are a top view, a front view, and a side view, respectively, of an example outdoor fluid receptacle 1400 with a substantially rectangular cross-section and including an example monitoring unit 1402. The example outdoor fluid receptacle 1400 can include a lid that can be removed or is permanently affixed to a body of the receptacle 1400. In some examples, the example monitoring unit 1402 is mounted on the lid with access to an interior chamber of the receptacle 1400. In certain instances, the example fluid receptacle 1400 also includes a power cord 1408 for powering certain components of the fluid receptacle 1400, an evacuation conduit 1410, and/or a pressure relief valve 1420. The example receptacle 1400 may include fewer or additional components, such as additional vents 1424 (one shown) for venting an interior chamber of the receptacle 1400, one or more heaters 1426 (two shown), and one or more fill ports 1428. In certain instances, outdoor receptacle units such as the example fluid receptacle 1400 of FIGS. 14A-14C include no or minimal components along the vertical sidewalls of the receptacle 1400 and instead include most or all control components on a top surface of the receptacle 1400. This construction places most or all of the control components out of reach of the general public, thereby reducing the chance for theft of contents or damage to equipment and components by the public or others that are not intended to access the receptacle 1400.

Any of the example fluid receptacles (900, 1100, 1200, 1300, and 1400) and/or monitoring units (902, 1102, 1202, 1302, and 1402) can be implemented in the fluid storage receptacle 502 and/or monitoring unit 100 of the example fluid storage system 500 of FIG. 5A (or in the fluid storage receptacle 502' of FIG. 5B).

Figure 7:
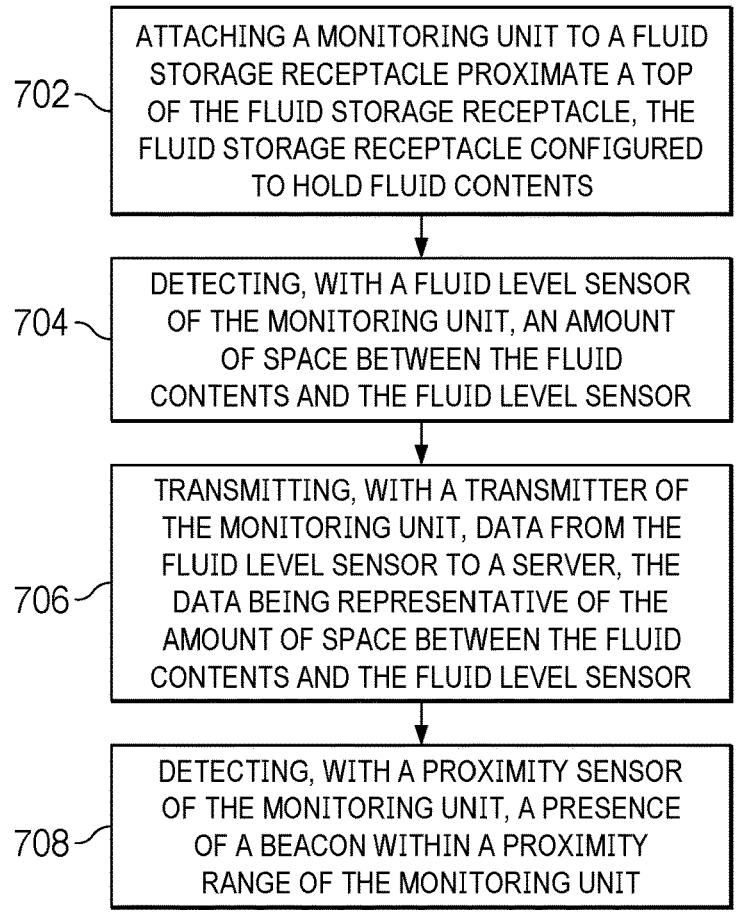
FIG. 7 is a flowchart of an example method for monitoring a fluid storage receptacle.

FIG. 7 is a flowchart of an example method 700 for monitoring a fluid storage receptacle, such as the fluid storage receptacle 502 of example fluid storage system 500 of FIG. 5A. At 702, a monitoring unit is attached to a fluid storage receptacle proximate a top of the fluid storage receptacle. The fluid storage receptacle is configured to hold fluid contents, such as used cooking oil. At 704, a fluid level sensor of the monitoring unit detects an amount of space between the fluid contents and the fluid level sensor. The amount of space between the fluid contents and the fluid level sensor is indicative of the level of the fluid contents of the tank, as the particular dimensions of the storage receptacle are known. At 706, a transmitter of the monitoring unit transmits data from the fluid level sensor to a server. The data is representative of the amount of space between the fluid contents and the fluid level sensor. At 708, a proximity sensor of the monitoring unit detects a presence of a beacon within a proximity range of the monitoring unit.

Figure 8:
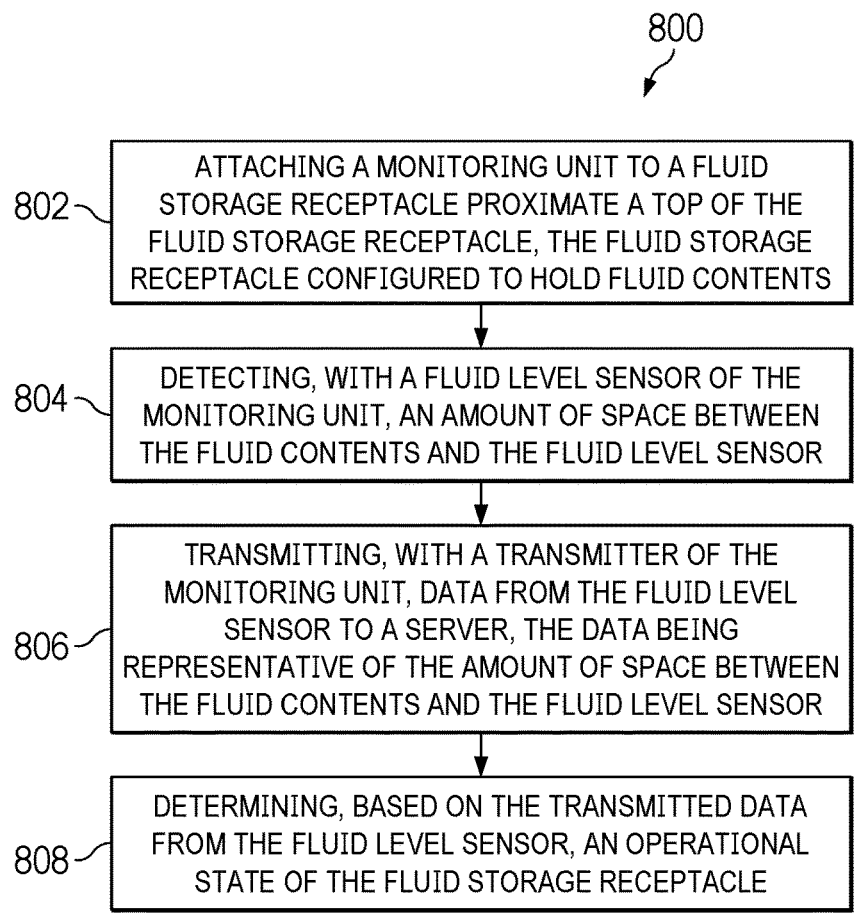
FIG. 8 is a flowchart of an example method for monitoring a fluid storage receptacle.

FIG. 8 is a flowchart of an example method 800 for monitoring a fluid storage receptacle, such as the fluid storage receptacle 502 of example fluid storage system 500 of FIG. 5A. At 802, a monitoring unit is attached to a fluid storage receptacle proximate a top of the fluid storage receptacle. The fluid storage receptacle is configured to hold fluid contents. At 804, a fluid level sensor of the monitoring unit detects an amount of space between the fluid contents and the fluid level sensor. The amount of space between the fluid contents and the fluid level sensor is indicative of the level of the fluid contents of the tank, as the particular dimensions of the storage receptacle are known. At 806, a transmitter of the monitoring unit transmits data from the fluid level sensor to a server. The data is representative of the amount of space between the fluid contents and the fluid level sensor. At 808, an operational state of the fluid storage receptacle is determined based on the transmitted data from the fluid level sensor. The determined operational state of the fluid storage receptacle can vary. In some examples, the operational state is determined to be that the fluid storage receptacle is in need of drainage, is proceeding with a scheduled drainage operation, is undergoing a theft attempt, is undergoing an unscheduled drainage operation, is preparing for a drainage operation (e.g., a heating element is heating the fluid contents within the fluid storage receptacle), is operating normally, is idle, is being filled, a combination of these operational states, or another operational state.

Figure 9:
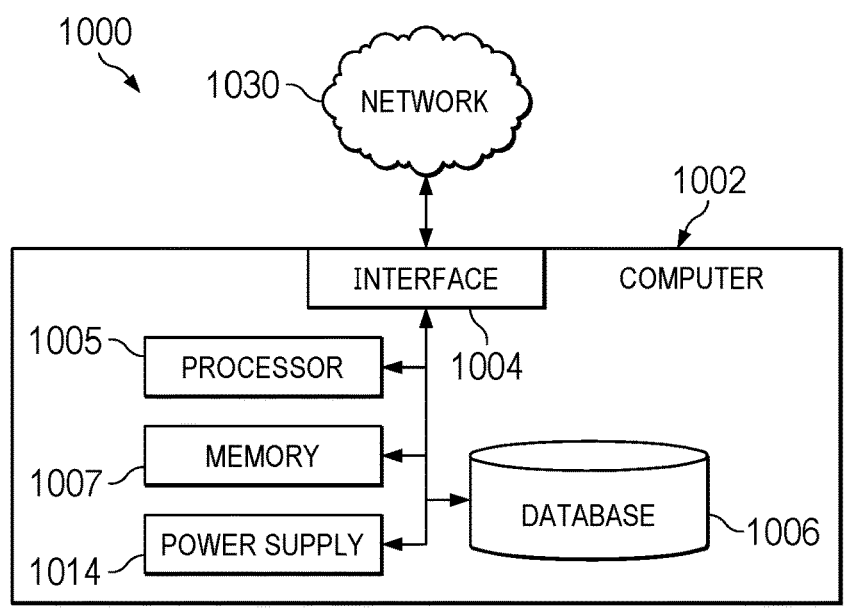
FIG. 9 is a block diagram illustrating an example computer system.

FIG. 9 is a block diagram of an example computer system 1000 that can be used to provide computational functionalities associated with described algorithms, methods, functions, processes, flows, and procedures described in the present disclosure, according to some implementations of the present disclosure. In some implementations, the monitoring unit 100 and/or the central monitoring system 512 can be the computer system 1000, include the computer system 1000, or include part of the computer system 1000. In some implementations, the monitoring unit 100 can communicate with the computer system 1000.

The illustrated computer 1002 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 1002 can include a Smart Embedded Management Agent (SEMA), such as a built-in ADLINK SEMA 2.2, and a video sync technology, such as Quick Sync Video technology supported by ADLINK MSDK+. In some examples, the computer 1002 can include the MXE-5400 Series processor-based fanless embedded computer by ADLINK, though the computer 1002 can take other forms or include other components.

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus. In some implementations, any or all of the components of the computer 1002, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 1002 and other components (whether illustrated or not) that are communicably coupled to the computer 1002. The functionality of the computer 1002 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 1002, in alternative implementations, the API or the service layer can be stand-alone components in relation to other components of the computer 1002 and other components communicably coupled to the computer 1002. Moreover, any or all parts of the API or the service layer can be implemented as child or sub-modules of another software module, enterprise application, or hardware module without departing from the scope of the present disclosure.

The computer 1002 can include an interface 1004. Although illustrated as a single interface 1004 in FIG. 9, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 9, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 can also include a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 9, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 9, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

An application can be an algorithmic software engine providing functionality according to particular needs, desires, or particular implementations of the computer 1002 and the described functionality. For example, an application can serve as one or more components, modules, or applications. Multiple applications can be implemented on the computer 1002. Each application can be internal or external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system including computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations have been described. Nevertheless, it will be understood that various modifications may be made without departing from the spirit and scope of the disclosure.

What is claimed is:

1. A fluid storage system, comprising:
a fluid storage receptacle defining an interior volume and configured to hold fluid contents, the fluid storage receptacle comprising a drainage fluid line and a fluid control valve in the drainage fluid line; and
a monitoring unit coupled to the fluid storage receptacle proximate a top of the fluid storage receptacle, the monitoring unit comprising:
a fluid level sensor directed vertically downward into the interior volume of the fluid storage receptacle, the fluid level sensor configured to detect an amount of space between the fluid contents and the fluid level sensor;
a transmitter configured to receive and transmit data from the fluid level sensor; and
a proximity sensor configured to detect a presence of a beacon on a service vehicle within a proximity range of the monitoring unit; and
wherein the fluid control valve is communicably coupled to the monitoring unit and configured to open the drainage fluid line to the fluid flow in response to the proximity sensor detecting the presence of the beacon on the service vehicle.

2. The fluid storage system of claim 1, comprising a ventilation cap at a top of the fluid storage receptacle, the ventilation cap configured to control ventilation of the interior volume of the fluid storage receptacle, and wherein the monitoring unit is coupled to the ventilation cap.

3. The fluid storage system of claim 1, wherein the fluid level sensor is an ultrasonic sensor.

4. The fluid storage system of claim 3, wherein the ultrasonic sensor comprises a horn configured to channel ultrasonic waves from the ultrasonic sensor toward fluid contents in the interior volume of the fluid storage receptacle.

5. The fluid storage system of claim 4, wherein the horn is a conical horn.

6. The fluid storage system of claim 1, wherein the monitoring unit comprises at least one magnet, and the fluid storage receptacle comprises an interior metallic surface, the monitoring unit configured to magnetically attach to the interior metallic surface of the fluid storage receptacle.

7. The fluid storage system of claim 1, wherein the fluid control valve comprises a motorized ball valve configured to selectively open in response to the proximity sensor detecting the presence of the beacon.

8. The fluid storage system of claim 1, further comprising a vacuum switch in the drainage fluid line downstream of the fluid control valve, the vacuum switch being communicably coupled to the monitoring unit, the vacuum switch configured to detect a pressure change in the drainage fluid line downstream of the fluid control valve.

9. A method, comprising:
attaching a monitoring unit to a fluid storage receptacle proximate a top of the fluid storage receptacle, the fluid storage receptacle configured to hold fluid contents;
detecting, with a fluid level sensor of the monitoring unit, an amount of space between the fluid contents and the fluid level sensor;
transmitting, with a transmitter of the monitoring unit, data from the fluid level sensor to a server, the data being representative of the amount of space between the fluid contents and the fluid level sensor;
detecting, with a proximity sensor of the monitoring unit, a presence of a beacon on a service vehicle within a proximity range of the monitoring unit; and in response to detecting the presence of the beacon on the service vehicle, opening a fluid control valve in a drainage fluid line of the fluid storage receptacle.

10. The method of claim 9, further comprising:
detecting that the beacon is no longer present within the proximity range, and
closing the fluid control valve in response to detecting that the beacon is no longer present within the proximity range.

11. The method of claim 9, wherein the fluid control valve comprises a motorized ball valve, and opening the fluid control valve comprises opening the motorized ball valve.

12. The method of claim 11, wherein opening the motorized ball valve comprises providing power to the motorized ball valve.

13. The method of claim 9, wherein the proximity range is about 30 feet, and detecting the presence of the beacon within the proximity range of the monitoring unit comprises detecting that the service vehicle comprising the beacon is within about 30 feet or less of the monitoring unit.

14. The method of claim 9, wherein the proximity sensor is a Bluetooth sensor.

15. The method of claim 14, wherein the Bluetooth sensor is a Bluetooth Low Energy sensor.

16. The method of claim 9, wherein attaching the monitoring unit to the fluid storage receptacle comprises attaching the monitoring unit to a ventilation cap at a top of the fluid storage receptacle, the ventilation cap configured to control ventilation of an interior volume of the fluid storage receptacle.

17. The method of claim 9, wherein attaching the monitoring unit to the fluid storage receptacle comprises magnetically attaching, with at least one magnet of the monitoring unit, the monitoring unit to a metallic interior surface of the fluid storage receptacle.

18. The method of claim 9, wherein the fluid level sensor is an ultrasonic sensor.

19. The method of claim 9, wherein transmitting data from the monitoring unit to a server comprises wirelessly transmitting data over a network to a remote server in a location remote from the monitoring unit.

20. The method of claim 9, wherein detecting the presence of the beacon further comprises associating, with the monitoring unit, the detected beacon with an authorized drainage operation.

21. The method of claim 9, further comprising, in response to detecting the presence of the beacon on the service vehicle, heating the fluid contents in the fluid storage receptacle with a heater.

22. A monitoring unit for a waste oil receptacle, the monitoring unit comprising:
an ultrasonic sensor configured to attach to a waste oil receptacle and detect an amount of empty space between fluid contents of the waste oil receptacle and the ultrasonic sensor;
a transmitter configured to receive and transmit data from the ultrasonic sensor;
a proximity sensor configured to detect a presence of a beacon on a service vehicle within a proximity range of the proximity sensor, the proximity sensor comprising a Bluetooth Low Energy sensor;
a housing to house the ultrasonic sensor, transmitter, and proximity sensor; and
at least one magnet coupled to the housing and configured to magnetically attach the monitoring unit to an interior metallic surface of the waste oil receptacle.

23. The monitoring unit of claim 22, wherein the transmitter is a wireless transmitter configured to transmit the data from the ultrasonic sensor over a network.

24. The monitoring unit of claim 22, further comprising a battery to provide power to the ultrasonic sensor, transmitter, and proximity sensor.

25. The monitoring unit of claim 22, wherein the at least one magnet is coupled to a side of the housing and configured to magnetically attach the monitoring unit to an interior metallic sidewall of the waste oil receptacle.

* * * * *